United States Patent
Smith et al.

(10) Patent No.: US 11,743,038 B2
(45) Date of Patent: Aug. 29, 2023

(54) METHODS AND SYSTEMS OF PROVIDING VERIFICATION OF INFORMATION USING A CENTRALIZED OR DISTRIBUTED LEDGER

(71) Applicant: Civic Technologies, Inc., San Francisco, CA (US)

(72) Inventors: Jonathan Robert Smith, Oakland, CA (US); Vinodan Karthikeya Lingham, Los Altos, CA (US); John Driscoll, Fremont, CA (US); Iain Charles Fraser, San Francisco, CA (US)

(73) Assignee: Civic Technologies, Inc., San Francisco, CA (US)

( * ) Notice: Subject to any disclaimer, the term of this patent is extended or adjusted under 35 U.S.C. 154(b) by 602 days.

(21) Appl. No.: 16/783,655

(22) Filed: Feb. 6, 2020

(65) Prior Publication Data

US 2020/0177377 A1    Jun. 4, 2020

Related U.S. Application Data

(63) Continuation of application No. 16/424,948, filed on May 29, 2019, now Pat. No. 10,558,974, which is a
(Continued)

(51) Int. Cl.
*H04L 9/08* (2006.01)
*H04L 9/30* (2006.01)
(Continued)

(52) U.S. Cl.
CPC .......... *H04L 9/0861* (2013.01); *G06Q 20/02* (2013.01); *G06Q 20/065* (2013.01);
(Continued)

(58) Field of Classification Search
CPC ....... H04L 9/0861; H04L 9/0637; H04L 9/14; H04L 9/30; H04L 9/3242; H04L 9/3247; H04L 63/061; H04L 63/0823; H04L 9/50
See application file for complete search history.

(56) References Cited

U.S. PATENT DOCUMENTS

| | | |
|---|---|---|
| 5,748,940 A | 5/1998 | Angelo et al. |
| 5,818,936 A | 10/1998 | Mashayekhi |

(Continued)

FOREIGN PATENT DOCUMENTS

WO    WO-2015/085393 A1    6/2015

OTHER PUBLICATIONS

Menezes, A., Katz, J., van Oorschot, P., Vanstone, S., Rosen, K. (1997). Handbook of Applied Cryptography. Boca Raton: CRC Press. pp. 403-405 (Year: 1997).*

(Continued)

*Primary Examiner* — Michael R Vaughan
(74) *Attorney, Agent, or Firm* — Volpe Koenig P.C.; Daniel E. Rose

(57) ABSTRACT

A method and system of providing verification of information of a user relating to an attestation transaction is provided, and includes sending a request for information of the user, wherein the information has been previously attested to in an attestation transaction stored within a centralized or distributed ledger at an attestation address; receiving at a processor associated with a verifier the information of the user; sending a cryptographic challenge nonce; receiving at the processor associated with the verifier the cryptographic challenge nonce signed by the user's private key; verifying user identity with the cryptographic challenge nonce signed by the user's private key; deriving a public attest key by using the information of the user; deriving an attestation address using the public attest key; and verifying the existence of the attestation transaction at the attestation address in the centralized or distributed ledger.

22 Claims, 18 Drawing Sheets

Related U.S. Application Data continuation of application No. 15/582,100, filed on Apr. 28, 2017, now Pat. No. 10,333,706.

(60) Provisional application No. 62/330,097, filed on Apr. 30, 2016.

(51) Int. Cl.

| | | |
|---|---|---|
| *H04L 9/32* | (2006.01) | |
| *H04L 9/40* | (2022.01) | |
| *G06Q 20/02* | (2012.01) | |
| *G06Q 20/40* | (2012.01) | |
| *H04L 9/14* | (2006.01) | |
| *G06Q 20/06* | (2012.01) | |
| *G06Q 20/38* | (2012.01) | |
| *H04L 9/06* | (2006.01) | |
| *G06Q 20/36* | (2012.01) | |
| *G06Q 20/32* | (2012.01) | |
| *H04L 9/00* | (2022.01) | |

(52) U.S. Cl.
CPC ..... *G06Q 20/3276* (2013.01); *G06Q 20/3278* (2013.01); *G06Q 20/3674* (2013.01); *G06Q 20/3829* (2013.01); *G06Q 20/38215* (2013.01); *G06Q 20/407* (2013.01); *G06Q 20/4015* (2020.05); *H04L 9/0637* (2013.01); *H04L 9/0891* (2013.01); *H04L 9/14* (2013.01); *H04L 9/30* (2013.01); *H04L 9/3066* (2013.01); *H04L 9/3236* (2013.01); *H04L 9/3239* (2013.01); *H04L 9/3242* (2013.01); *H04L 9/3247* (2013.01); *H04L 9/3271* (2013.01); *H04L 63/0435* (2013.01); *H04L 63/0442* (2013.01); *H04L 63/0492* (2013.01); *H04L 63/061* (2013.01); *H04L 63/0823* (2013.01); *G06Q 2220/00* (2013.01); *H04L 9/50* (2022.05); *H04L 2209/56* (2013.01)

(56) References Cited

U.S. PATENT DOCUMENTS

| | | | |
|---|---|---|---|
| 9,356,965 B2 | 5/2016 | Kjeldaas | |
| 9,852,285 B2 | 12/2017 | Loughlin-McHugh et al. | |
| 9,985,964 B2 | 5/2018 | Andrade | |
| 10,361,849 B2 | 7/2019 | Smith et al. | |
| 10,666,434 B2 * | 5/2020 | Smith | G06Q 20/065 |
| 2004/0003248 A1 | 1/2004 | Arkhipov | |
| 2005/0268103 A1 | 12/2005 | Camenisch | |
| 2007/0244831 A1 | 10/2007 | Kuo | |
| 2008/0162305 A1 | 7/2008 | Rousso et al. | |
| 2011/0072274 A1 * | 3/2011 | Leoutsarakos | H04L 9/3255 713/182 |
| 2011/0087887 A1 * | 4/2011 | Luft | H04W 12/10 713/178 |
| 2013/0185214 A1 | 7/2013 | Azen et al. | |
| 2014/0136346 A1 | 5/2014 | Teso | |
| 2015/0332256 A1 | 11/2015 | Minor | |
| 2015/0371224 A1 | 12/2015 | Lingappa | |
| 2016/0098730 A1 | 4/2016 | Feeney | |
| 2016/0162897 A1 | 6/2016 | Feeney | |
| 2016/0294783 A1 | 10/2016 | Piqueras Jover et al. | |
| 2016/0342977 A1 | 11/2016 | Lam | |
| 2017/0163471 A1 | 6/2017 | Zheng | |
| 2017/0213221 A1 | 7/2017 | Kurian et al. | |
| 2017/0228731 A1 | 8/2017 | Sheng et al. | |
| 2017/0243193 A1 | 8/2017 | Manian et al. | |
| 2017/0316409 A1 * | 11/2017 | Smith | G06Q 20/3276 |
| 2017/0317834 A1 * | 11/2017 | Smith | H04L 9/0637 |
| 2018/0204191 A1 | 7/2018 | Wilson et al. | |
| 2019/0207750 A1 | 7/2019 | Harvey | |
| 2019/0236594 A1 | 8/2019 | Ehrlich-Quinn | |

OTHER PUBLICATIONS

Andreas M. Antonopoulos. 2014. Mastering Bitcoin: Unlocking Digital Crypto-Currencies (1st. ed.). O'Reilly Media, Inc. (Year: 2014).*

Antonopoulos et al., "Mastering Bitcoin", O'Reilly, Chapters 1-7, Mar. 6, 2015, downloaded from http://chimera.labs.oreilly.com/books/1234000001802/index.html, 9 pages.

Antonopoulos, "Chapter 9. Alternative Chains, Currencies, and Applications," Mastering Bitcoin, retrieved from https://www.oreilly.com/library/view/mastering-bitcoin/9781491902639/ch09.html, 18 pages (2014).

Antonopoulos: "Mastering Bitcoin—Unlocking Digital Crypto Currencies", Dec. 2014 (Dec. 2014), pp. 1-282, XP055581333.

Bare, J. Christopher, "Attestation and Trusted Computing," CSEP 590: Practical Aspects of Modern Cryptography, Mar. 2006, 10 pages.

Christopher, A. "Revocable, Self-Signed TLS Certificates," May 8, 2015, Archived Jul. 21, 2015 and retrieved from https://web.archive.org/web/20150721113824/https://github.com/ChristopherA/revocable-self-signed-tls-certificates-hack, 8 pages.

Extended European Search Report on EP 17790578.3 dated Nov. 22, 2019 (6 pages).

International Preliminary Report on Patentability for PCT/US2017/030205 dated Nov. 15, 2018, 10 pages.

Meadows, Catherine, "The NRL Protocol Analyzer: An Overview," Journal of Logic Programming, 1994, 19 pages.

Menezes, A., Katz, J. van Oorschot, P., Vanstone, S., Rosen, K. (1997) Handbook of Applied Cryptography. Boca Raton: CRC Press (5 pages).

Menezes, Alfred J. et al., "Handbook of Applied Cryptography" 1997 CRC Press, LLC, pp. 31-32.

Non-Final Office Action on U.S. Appl. No. 15/971,898 dated Aug. 10, 2018 (13 pages).

Non-Final Office Action on U.S. Appl. No. 16/424,978 dated Jul. 23, 2019.

Notice of Allowance on U.S. Appl. No. 15/582,122 dated Dec. 20, 2019 (7 pages).

Notice of Allowance on U.S. Appl. No. 16/424,978 dated Jan. 10, 2020 (14 pages).

U.S. Advisory Action on U.S. Appl. No. 15/582,122 dated Jun. 3, 2019, 5 pages.

U.S. Non-Final Office Action for U.S. Appl. No. 15/582,122 dated Oct. 4, 2019, 8 pages.

U.S. Notice of Allowance for U.S. Appl. No. 16/424,948 dated Sep. 25, 2019, 16 pages.

U.S. Notice of Allowance on U.S. Appl. No. 15/397,576 dated Mar. 13, 2019, 15 pages.

U.S. Notice of Allowance on U.S. Appl. No. 15/582,100 dated Feb. 25, 2019, 17 pages.

U.S. Notice of Allowance on U.S. Appl. No. 15/582,100 dated Apr. 17, 2019, 5 pages.

U.S. Notice of Allowance on U.S. Appl. No. 15/971,898 dated May 15, 2019, 9 pages.

U.S. Office Action on U.S. Appl. No. 15/397,576 dated Jun. 7, 2018, 20 pages.

U.S. Office Action on U.S. Appl. No. 15/397,576 dated Nov. 21, 2018, 18 pages.

U.S. Office Action on U.S. Appl. No. 15/582,100 dated Jul. 26, 2018, 9 pages.

U.S. Office Action on U.S. Appl. No. 15/582,110 dated Nov. 28, 2018, 20 pages.

U.S. Office Action on U.S. Appl. No. 15/582,116 dated Jan. 10, 2019, 21 pages.

U.S. Office Action on U.S. Appl. No. 15/582,116 dated Aug. 6, 2018, 17 pages.

U.S. Office Action on U.S. Appl. No. 15/582,122 dated Mar. 7, 2019, 14 pages.

U.S. Office Action on U.S. Appl. No. 15/582,122 dated Aug. 10, 2018, 13 pages.

U.S. Office Action on U.S. Appl. No. 15/582,130 dated Jan. 18, 2019, 25 pages.

(56) References Cited

OTHER PUBLICATIONS

U.S. Office Action on U.S. Appl. No. 15/582,130 dated Aug. 6, 2018, 19 pages.
U.S. Office Action on U.S. Appl. No. 15/960,424 dated Aug. 23, 2018, 20 pages.
U.S. Office Action on U.S. Appl. No. 15/971,874 dated Dec. 4, 2018, 21 pages.
U.S. Office Action on U.S. Appl. No. 15/971,885 dated Jan. 11, 2019, 25 pages.
U.S. Office Action on U.S. Appl. No. 15/971,885 dated Jun. 20, 2018, 17 pages.
U.S. Office Action on U.S. Appl. No. 15/971,898 dated Mar. 8, 2019, 15 pages.
U.S. Office Action on U.S. Appl. No. 15/971,903 dated Jan. 8, 2019, 23 pages.
U.S. Office Action on U.S. Appl. No. 15/971,903 dated Jun. 20, 2018, 18 pages.
Van Saberhagen, Nicolas, "CryptoNote v2.0," Oct. 17, 2013, 20 pages.
Wikipedia entry for "Digital Signatures," archived on Jan. 9, 2013 and retrieved from https://web.archive.org/web/20130109210635/https://en.wikipedia.org/wiki/Digital_signautre, 9 pages.
Wikipedia entry for "Revocation List," archived on Feb. 1, 2013 and retrieved from https://web.archive.org/web/20130201003433/https://en.wikipedia.org/wiki/certificate_revocation_list, 3 pages.

* cited by examiner

METHODS AND SYSTEMS OF PROVIDING VERIFICATION OF INFORMATION USING A CENTRALIZED OR DISTRIBUTED LEDGER

CROSS-REFERENCE TO RELATED APPLICATIONS

This application claims the benefit of and priority as a continuation to U.S. Nonprovisional patent application Ser. No. 16/424,948, entitled "Methods and Systems of Providing Verification of Information using a Centralized or Distributed Ledger," filed May 29, 2019; which claims priority as a continuation to U.S. Nonprovisional patent application Ser. No. 15/582,100, entitled "Methods and Systems of Providing Verification of Information using a Centralized or Distributed Ledger," filed Apr. 28, 2017; which claims priority to U.S. Provisional Patent Application No. 62/330, 097 filed on Apr. 30, 2016, entitled "Decentralized Personal Information Authentication System," each of which is hereby incorporated by reference in its entirety herein.

TECHNICAL FIELD

The present disclosure relates generally to techniques for providing attestation of information with use of a centralized or distributed ledger.

BACKGROUND

Existing methods of validating information and identity and maintaining information and identity security have numerous weaknesses. For instance, the leaking of private user information, such as a social security number (SSN) or credit card number, makes it possible for malefactors to imitate another person and to perform unauthorized transactions on their behalf. Security breaches resulting in leaks of this type of information have become commonplace with large retailers.

Identity verification is often overly reliant on communication networks that are unreliable. When the network goes down or has insufficient connectivity, transaction systems can be completely inhibited causing loss of funds in a retail context and causing tremendous delays in other transactions. Information verification is also often reliant upon physical documents that can be counterfeited. Identity verification is often reliant on mere knowledge of personal information, especially in scenarios where the person is not present to prove identity, such as phone calls or online.

Attempts to use personally identifiable information (PII) are inconsistently protected by vendors. For example, attempts to use a person's SSN to apply for new credit are often reported to that person only after a credit inquiry has been performed. As a result, in the case of a fraudulent use of a SSN, victims are often informed after some or all of the damage has occurred, if they are informed at all.

Accordingly, there remains a need for improved devices, systems, and methods for protecting the use of user identity and for securely providing personal information.

SUMMARY

In one aspect of the disclosed subject matter, a method and system of providing attestation of information by an attestor is provided, including receiving the information and a public key generated for the information; applying a hash function to the information to create a hash; combining the hash of the information with the public key generated for the information to generate a public attest key; generating an attestation address based on the public attest key; and communicating a signed transaction to a centralized or distributed ledger for storage at the attestation address.

In some embodiments, elliptic curve addition is used to combine the hash of the information with the public key generated for the information to generate the public attest key.

In some embodiments, the public attest key is generated by using the hash of the information as an offset and using the public key generated for the information to generate the public attest key. In some embodiments, generation of the public attest key by using the hash of the information as an offset is performed in a manner compliant with the Bitcoin BIP32 standard for hierarchical deterministic wallets.

In some embodiments, generating the attestation address comprises combining two or more public keys of potential signers utilizing a multi-signature script which implements the Pay to Script Hash (P2SH) function. The public keys of potential signers can include one or more of the public attest key, a public key of a wallet provider, a public key of the attestor, and a recovery public key of a user.

In some embodiments, generating the attestation address for a single signature transaction includes applying a second hash function to the public attest key. The second hash function can include the P2PKH algorithm.

In some embodiments, generating the attestation address for a multiple signature transaction includes generating a redeem script using the public keys of the multiple signatories, serializing the redeem script to create a serialized output, applying a second hash function to the serialized output to create a second hash, and applying a third hash function to the second hash. The second hash function can include the SHA256 algorithm, and the third hash function can include the RIPEMD160 algorithm.

In some embodiments, the centralized or distributed ledger is the bitcoin blockchain.

A data block for providing attestation of information associated with a transaction for storage in a centralized or distributed ledger is provided, including a public attest key generated by applying a hash function to the information to create a hash, and combining the hash of the information with a public key generated for the information; and an attestation address for storage of the transaction on the centralized or distributed ledger based on the public attest key.

In some embodiments, elliptic curve addition is used to combine the hash of the information with the public key generated for the information to generate the public attest key.

In some embodiments, the hash of the information is used as an offset with the public key generated for the information to generate the public attest key.

In some embodiments, the attestation address is generated by combining two or more public keys of potential signers utilizing a multi-signature script which implements the Pay to Script Hash (P2SH) function. The public keys of potential signers can include one or more of the public attest key, a public key of a wallet provider, a public key of the attestor, and a recovery public key of a user.

In some embodiments, the attestation address for a single signature transaction is created by applying a second hash function to the public attest key. The second hash function can include the P2PKH algorithm.

In some embodiments, the attestation address for a multiple signature transaction is created by generating a redeem script using the public keys of the multiple signatories, serializing the redeem script to create a serialized output, applying a second hash function to the serialized output to create a second hash, and applying a third hash function to the second hash. The second hash function can include the SHA256 algorithm, and the third hash function can include the RIPEMD160 algorithm.

In another aspect of the disclosed subject matter, a method of providing verification of information of a user relating to an attestation transaction is provided. The method is implemented on a computer system having one or more physical processors configured by machine-readable instructions which, when executed perform the method, and includes sending a request for information of the user, wherein the information has been previously attested to in an attestation transaction stored within a centralized or distributed ledger at an attestation address, the centralized or distributed ledger providing a record of transactions; receiving at a processor associated with a verifier the information of the user; sending a cryptographic challenge nonce; receiving at the processor associated with the verifier the cryptographic challenge nonce signed by the user's private key; verifying user identity with the cryptographic challenge nonce signed by the user's private key; deriving a public attest key by using the information of the user; deriving an attestation address using the public attest key; and verifying the existence of the attestation transaction at the attestation address in the centralized or distributed ledger.

In some embodiments, sending a request for information further includes sending a request for the user's public key; and receiving the information further includes receiving the user's public key.

In some embodiments, verifying user identity further includes checking the user's public key and the cryptographic challenge nonce signed by the user's private key.

In some embodiments, deriving a public attest key further includes using the information and the user's public key to derive the public attest key.

In some embodiments, the method further includes providing a processor associated with an attestor for generating the attestation transaction.

In some embodiments, the method further includes verifying that the attestation address for the attestation transaction can be derived using the Pay to Script Hash (P2SH) with the public attest key, and the attestor's public key.

In some embodiments, the method further includes verifying that the attestation address for the attestation transaction can be derived using the Pay to Script Hash (P2SH) with the public attest key, the attestor's public key, and a third party cosigner public key.

In some embodiments, sending a request for information further includes sending a request for the attestor's public key and a third party cosigner's public key.

In some embodiments, using the information to derive the public attest key further includes using at least one of the user's public key, an attestor's public key and a third party cosigner's public key to derive the public attest key.

In some embodiments, deriving a public attest key includes deriving the public attest key using an application or website of the attestor.

In some embodiments, deriving a public attest key includes deriving the public attest key using a third party application or website.

In some embodiments, the processor associated with the verifier sends the information received by the user to the processor associated with the attestor and receives the public attest key from the processor associated with the attestor.

In some embodiments, the computer system associated with the verifier generates the public attest key. In some embodiments, the computer system associated with the verifier generates the attestation address.

In some embodiments, the computer system associated with the verifier sends the user information and the user's public key to a third party application or website and the computer system associated with the verifier receives the public attest key and the attestation address from third party application or website In some embodiments, the computer system associated with the verifier uses a third party digital wallet provider application or website to verify the existence of the attestation transaction at the attestation address.

In some embodiments, the computer system associated with the verifier send the information received from the user to an attestor to verify the attestation transaction at the attestation address.

In some embodiments, sending a request for information of the user, includes providing a request to the user for information of the user, and receiving the information of the user includes receiving from the user the information of the user.

In some embodiments, sending a request for information of the user, includes providing a request to an attestor for information of the user; and receiving the information of the user includes receiving from the attestor the information of the user.

A system for providing verification of information of a user relating to an attestation transaction is provided. The system includes a computer system having one or more physical processors configured by machine-readable instructions to: send a request for information of the user, wherein the information has been previously attested to in an attestation transaction stored within a centralized or distributed ledger at an attestation address, the centralized or distributed ledger providing a record of transactions; receive at a processor associated with the verifier the information of the user; send a cryptographic challenge nonce; receive at the processor associated with the verifier the cryptographic challenge nonce signed by the user's private key; verify user identity with the cryptographic challenge nonce signed by the user's private key; derive a public attest key by using the information of the user; derive an attestation address using the public attest key; and verify the existence of the attestation transaction at the attestation address in the centralized or distributed ledger.

In another aspect of the disclosed subject matter, a method of revoking an attestation transaction regarding information of a user is provided. The method is implemented on a computer system having one or more physical processors configured by machine-readable instructions which, when executed perform the method, including generating a signed revocation transaction to revoke the previously attested information; and sending the signed revocation transaction to the centralized or distributed ledger, wherein the information has been previously attested to in an attestation transaction stored within a centralized or distributed ledger at an attestation address, the centralized or distributed ledger providing a verifiable record of transactions, and revoking the attestation transaction by spending cryptocurrency associated with the attestation transaction.

In some embodiments, the method further includes receiving a public key generated for the information; combining a hash of the information with the public key to generate a public attest key; and generating the attestation address based on the public attest key.

In some embodiments, generating the signed transaction includes using a public key of the user.

In some embodiments, the method further includes providing a processor associated with an attestor for generating the attestation address associated with the attestation transaction.

In some embodiments, generating the signed transaction includes using at least one of a public key of the user and a public key of the attestor. In some embodiments, generating the signed transaction includes using at least one of a public key of the user, a public key of the attestor, and a public key of a third party.

In some embodiments, the previously attested information to be revoked includes at least a portion of the previously attested information that is no longer valid.

In some embodiments, spending cryptocurrency associated with the attestation transaction includes transferring cryptocurrency to a wallet associated with the attestor.

In some embodiments, the method further includes providing a third party having a relationship with a user, and receiving a request for revocation from the third party because a relationship between the user and the third party has become invalid.

In some embodiments, a processor associated with the user generates the signed transaction which spends the cryptocurrency or dust associated with the existing attestation.

In some embodiments, the processor associated with the attestor generates the signed transaction which spends the cryptocurrency or dust associated with a transaction.

In some embodiments, a processor associated with the user performs the step of identifying previously attested information to be revoked, and the processor associated with the attestor performs the steps of generating a signed revocation transaction to revoke the previously attested information; and broadcasting the signed revocation transaction to the centralized or distributed ledger and revoking the attestation transaction.

A method is implemented on a computer system having one or more physical processors configured by machine-readable instructions which, when executed perform the method, including generating a signed revocation transaction to revoke the previously attested information; and sending the signed revocation transaction to the centralized or distributed ledger, wherein the information has been previously attested to in an attestation transaction stored within a centralized or distributed ledger at an attestation address, the centralized or distributed ledger providing a verifiable record of transactions, and revoking the attestation transaction by spending cryptocurrency associated with the attestation transaction; and if there is new information to be attested to, generating a second attestation address associated with a second attestation transaction.

In some embodiments, the method includes prior to generating a second attestation address, determining whether there is new information for attestation.

In some embodiments, generating a second attestation address includes receiving a public key generated for the new information; combining a hash of the new information with the public key to generate a public attest key; and generating the second attestation address based on the public attest key.

In some embodiments, the new information includes previously attested information to be revoked. In some embodiments, the new information is associated with a different user than the previously attested information to be revoked.

In some embodiments, the method further includes providing a processor associated with an attestor for generating the second attestation address associated with the second attestation transaction based on the information.

In some embodiments, the method further includes generating a signed attestation using at least one of a public key of the user, a public key of the attestor, and a public key of a third party.

A system of revoking an attestation transaction regarding information of a user is provided. The system includes a computer system having one or more physical processors configured by machine-readable instructions to generate a signed revocation transaction to revoke the previously attested information, wherein the information has been previously attested to in an attestation transaction stored within a centralized or distributed ledger at an attestation address, the centralized or distributed ledger providing a verifiable record of transactions; and send the signed revocation transaction to the centralized or distributed ledger and revoking the attestation transaction by spending cryptocurrency associated with the attestation transaction.

In yet another aspect of the disclosed subject matter, a method of executing a business transaction from a commercial website is provided. The method is implemented on a computer system having one or more physical processors configured by machine-readable instructions which, when executed perform the method, including receiving at processor associated with the commercial website an indication from a user to start processing a business transaction; sending a request for information of the user, wherein the information has been previously attested to in an attestation transaction stored within a centralized or distributed ledger at an attestation address, the centralized or distributed ledger providing a verifiable record of transactions; receiving at the processor associated with the commercial website the information of the user; sending a cryptographic challenge nonce; receiving at the processor associated with the commercial website the cryptographic challenge nonce signed by the user's private key; verifying user identity with the cryptographic challenge nonce signed by the user's private key; deriving a public attest key by using the information of the user; deriving an attestation address using the public attest key; verifying the existence of the attestation transaction at the attestation address in the centralized or distributed ledger; and upon verification of the existence of the attestation transaction, completing the business transaction.

In some embodiments, the business transaction is a purchase transaction. In some embodiments, the commercial website is a merchant website. In some embodiments, the method further includes facilitating the indication of the user to start processing the transaction through an electronic display.

In some embodiments, receiving an indication from a user to start processing a transaction comprises receiving login information from the user and validating the login information.

In some embodiments, sending a request for information of the user includes providing a request to the user for information of the user. In some embodiments, receiving the information of the user includes receiving from the user the information of the user.

In some embodiments, sending a request for information of the user includes providing a request to an attestor for information of the user. In some embodiments, receiving the information of the user includes receiving from the attestor the information of the user.

In some embodiments, sending a cryptographic challenge nonce includes sending a cryptographic challenge nonce to a digital wallet of the user. In some embodiments, receiving the cryptographic challenge nonce signed by the user's private key includes receiving from the digital wallet of the user the cryptographic challenge nonce signed by the user's private key.

In some embodiments, the attestation transaction includes receiving from the user the information and a public key generated for the information; applying a hash function to the information to create a hash; combining the hash of the information with the public key generated for the information to generate a public attest key; generating an attestation address based on the public attest key; and communicating a signed transaction to the centralized or distributed ledger for storage at the attestation address.

A system for executing a business transaction from a commercial website, the system comprising a computer system having one or more physical processors configured by machine-readable instructions to: receive an indication from a user to start processing a business transaction; send a request for information of the user, wherein the information has been previously attested to in an attestation transaction stored within a centralized or distributed ledger at an attestation address, the centralized or distributed ledger that provides a verifiable record of transactions; receive at the processor associated with the commercial website the information of the user; send a cryptographic challenge nonce; receive at the processor associated with the commercial website the cryptographic challenge nonce signed by the user's private key; verify user identity with the cryptographic challenge nonce signed by the user's private key; derive a public attest key by using the information of the user; derive an attestation address using the public attest key; verify the existence of the attestation transaction at the attestation address in the centralized or distributed ledger; and upon verification of the existence of the attestation transaction, complete the business transaction.

In some embodiments, the system further includes an electronic display to facilitate the indication of the user to start processing the transaction through.

In some embodiments, the one or more physical processors are further configured by machine-readable instructions to: receive login information from the user and validate the login information.

In some embodiments, the one or more physical processors are further configured by machine-readable instructions to: send a request for information of the user, comprising providing a request to the user for information of the user, wherein the information has been previously attested to in an attestation transaction. In some embodiments, receiving the information of the user includes receiving from the user the information of the user In some embodiments, sending a request for information of the user includes providing a request to an attestor for information of the user, wherein the information has been previously attested to in an attestation transaction. In some embodiments, receiving the information of the user includes receiving from the attestor the information of the user.

In some embodiments, the computer system is configured by machine-readable instructions to the send the cryptographic challenge nonce to the digital wallet of the user. In some embodiments, the computer system is configured by machine-readable instructions to receive from the digital wallet of the user the cryptographic challenge nonce signed by the user's private key.

In some embodiments, the system is configured to perform the attestation transaction, wherein the one or more physical processors are further configured by machine-readable instructions to receive from the user the information and a public key generated for the information; apply a hash function to the information to create a hash; combine the hash of the information with the public key generated for the information to generate a public attest key; generate an attestation address based on the public attest key; and communicate a signed transaction to the centralized or distributed ledger for storage at the attestation address.

In a still further aspect of the disclosed subject matter, a method of executing a business transaction with a commercial entity, such as a merchant, the method being implemented on a computer system having one or more physical processors configured by machine-readable instructions which, when executed perform the method, comprising: receiving at a processor associated with the merchant a code representing information of a user, wherein the code is provided by an output device for a processor associated with the user, and wherein the information has been previously attested to in an attestation transaction stored within a centralized or distributed ledger at an attestation address, the centralized or distributed ledger providing a record of transactions; converting the code to the information of the user; deriving a public attest key by using the information of the user; deriving an attestation address using the public attest key; verifying the existence of the attestation transaction at the attestation address in the centralized or distributed ledger; and upon verification of the existence of the attestation transaction, completing the business transaction.

In some embodiments, prior to completing the business transaction, the method includes sending a cryptographic challenge nonce to the processor associated with the user; receiving at the processor associated with the merchant the cryptographic challenge nonce signed by the user's private key; and verifying user identity with the cryptographic challenge nonce signed by the user's private key and the user's public key.

In some embodiments, receiving at the processor associated with the merchant a code representing information of the user, includes receiving a visual code displayed on a display unit for a processor associated with user.

In some embodiments, receiving at the processor associated with the merchant a visual code representing information of the user includes optically recognizing the visual code displayed on the display unit for the processor associated with the user. In some embodiments, receiving at the processor associated with the merchant a visual code representing information of the user includes placing an optical recognition device associated with the processor of the merchant in visual proximity with the display unit for the processor associated with the user.

In some embodiments, receiving at the processor associated with the merchant a code representing information of the user, includes receiving a signal transmitted by a short range transmitter for a processor associated with user. In some embodiments, the signal transmitted by the short range transmitter includes at least one of local Wi-Fi, Bluetooth, Bluetooth LE, near field communications (NFC), infrared, RFID, ambient audio, and supersonic audio communication.

A system for executing a business transaction from a commercial entity, such as a merchant, is provided. The system includes a computer system having one or more physical processors configured by machine-readable instructions to receive at a processor associated with the merchant a visual code representing information of a user, wherein the code is provided by an output device for a processor associated with the user, and wherein the information has been previously attested to in an attestation transaction stored within a centralized or distributed ledger at an attestation address, the centralized or distributed ledger providing a record of transactions; convert the code to the information of the user; derive a public attest key by using the information of the user; derive an attestation address using the public attest key; verify the existence of the attestation transaction at the attestation address in the centralized or distributed ledger; and upon verification of the existence of the attestation transaction, complete the business transaction.

In some embodiments, the computer system is further configured by machine-readable instructions to send a cryptographic challenge nonce to the processor associated with the user; receive at the processor associated with the merchant the cryptographic challenge nonce signed by the user's private key; and verify user identity with the cryptographic challenge nonce signed by the user's private key and the user's public key.

In some embodiments, the code is a visual code displayed on a display unit for a processor associated with user. In some embodiments, an optical recognition device associated with the processor of the merchant, configured to optically recognize the visual code displayed on the display unit for the processor associated with the user. In some embodiments, the visual code includes a barcode or a motion QR and optical recognition device includes a camera or a scanner.

In some embodiments, the code is a signal transmitted by a short range transmitter for a processor associated with user. In some embodiments, the signal transmitted by the short range transmitter includes at least one of local Wi-Fi, Bluetooth, Bluetooth LE, near field communications (NFC), infrared, RFID, ambient audio, and supersonic audio communication.

In some embodiments, the computer system is further configured by machine-readable instructions to maintain a database of attestation transactions, each attestation transaction relating to one or more items of information of the user, the attestation transaction includes an attestation address based on a public attest key, and wherein the public attest is derived by combining a hash of the information with a user's public key generated for the information.

In some embodiments, the computer system is further configured by machine-readable instructions to provide on the display unit a presentation for selection by the user of the one or more items of information; receive a user selection of attested information; and display a visual code representing the selected attested information.

In some embodiments, the processor associated with the user includes a mobile device.

A method of providing verification of the identity of a digital entity is provided, the method being implemented on a computer system having one or more physical processors configured by machine-readable instructions which, when executed, perform the method, comprising: receiving at a processor associated with a user, information and a public key of the digital entity, wherein the information has been previously attested to in an attestation transaction stored within a centralized or distributed ledger at an attestation address, the centralized or distributed ledger providing a record of transactions; deriving an attestation address using the information and the public key of the digital entity; verifying the existence of the attestation transaction at the attestation address in the centralized or distributed ledger and verifying that the attestation transaction has not been revoked; sending a cryptographic challenge nonce to a processor associated with the digital entity; receiving at the processor associated with the user the cryptographic challenge nonce signed by the digital entity's private key; and verifying the digital entity's identity with the cryptographic challenge nonce signed by the digital entity's key.

In some embodiments, receiving at a processor associated with a user, information and a public key of the digital entity includes sending a request to a processor associated with the digital entity a request for the information and public key of the digital entity.

In some embodiments, the public key of the digital entity includes a digital certificate.

In some embodiments, deriving an attestation address using the information and the public key of the digital entity includes using the information to derive a public attest key.

In some embodiments, deriving an attestation address using the information and the public key of the digital entity further includes using the public attest key and the public key of the digital entity to derive the attestation address.

In some embodiments, verifying that the attestation transaction has not been revoked includes checking to see if the attestation address exists in the UTXO cache.

In some embodiments, the digital entity is a website associated with a provider of goods or services or a financial institution.

A system for providing verification of the identity of a digital entity is provided, the system includes a computer system having one or more physical processors configured by machine-readable instructions to receive at a processor associated with a user, information and a public key of the digital entity, wherein the information has been previously attested to in an attestation transaction stored within a centralized or distributed ledger at an attestation address, the centralized or distributed ledger providing a record of transactions; derive an attestation address using the information and the public key of the digital entity; verify the existence of the attestation transaction at the attestation address in the centralized or distributed ledger and that the attestation transaction has not been revoked; send a cryptographic challenge nonce to a processor associated with the digital entity; receive at the processor associated with the user the cryptographic challenge nonce signed by the digital entity's private key; and verify the digital entity's identity with the cryptographic challenge nonce signed by the digital entity's key.

BRIEF DESCRIPTION OF THE DRAWINGS

The foregoing and other objects, features and advantages of the devices, systems, and methods described herein will be apparent from the following description of particular embodiments thereof, as illustrated in the accompanying drawings. The drawings are not necessarily to scale, emphasis instead being placed upon illustrating the principles of the devices, systems, and methods described herein.

DETAILED DESCRIPTION

Figure 1:
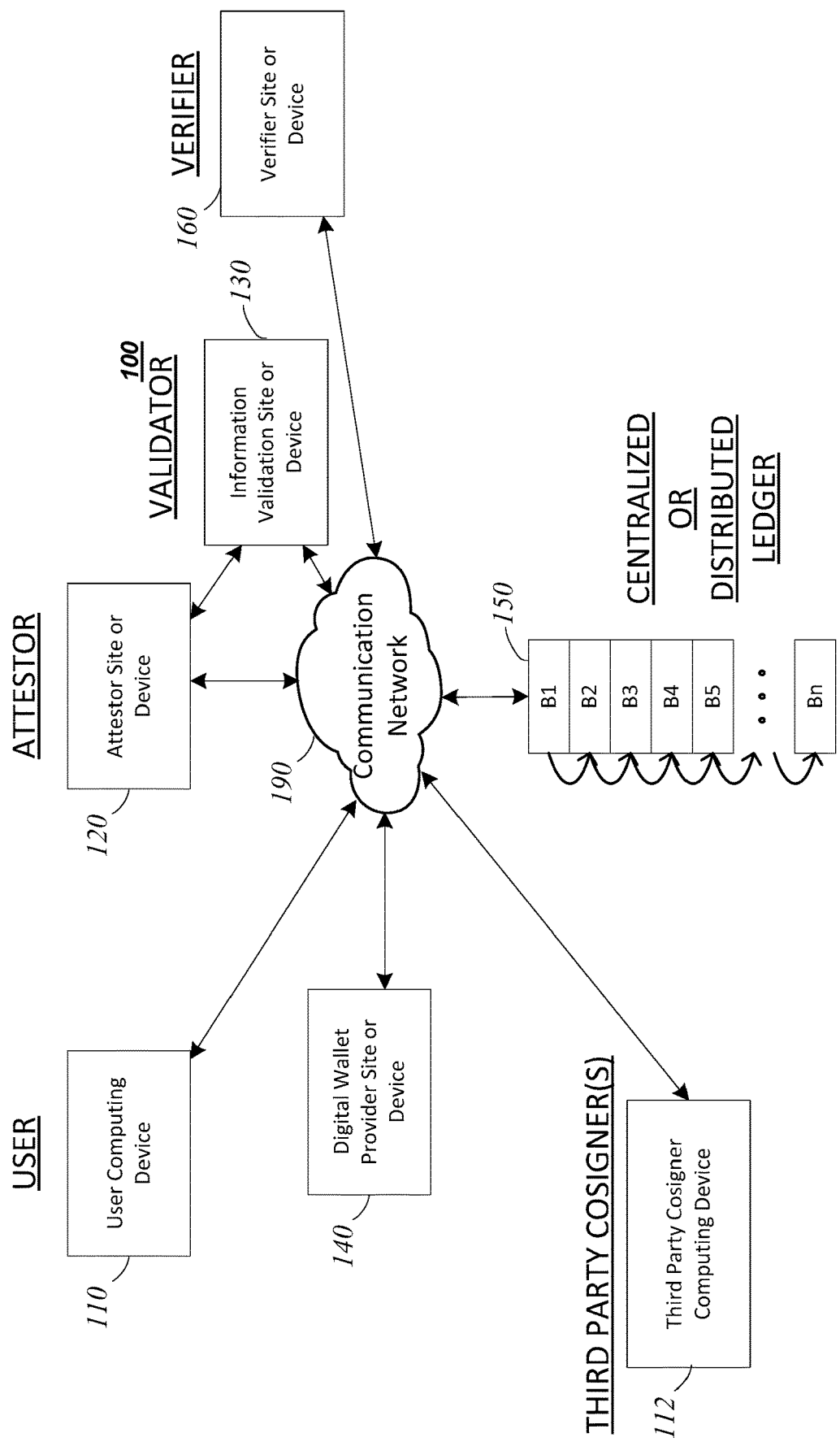
FIG. 1 is a diagram illustrating a system for providing attestation of information, using a centralized or distributed ledger in accordance with exemplary embodiments of the disclosed subject matter.

Methods and apparatus for use in providing authentication by an attestor of personal identification information of a user are described herein. In one illustrative example, the user's personal identification information is received. Upon validation of this information, a first hash function is applied to the user's personal identification information to create a hash. A public attestation key is generated by combining the hash of the user's personal identification information with one or more public keys which includes a public key of the user. In one implementation, an attestation address is generated by applying a second hash function to the user's public key. A signed transaction which includes the public attestation key is generated and communicated for storage in a centralized or distributed ledger at the attestation address. The signed transaction in the ledger may be verified by a third party.

The embodiments will now be described more fully hereinafter with reference to the accompanying figures, in which preferred embodiments are shown. The foregoing may, however, be embodied in many different forms and should not be construed as limited to the illustrated embodiments set forth herein.

All documents mentioned herein are hereby incorporated by reference in their entirety. References to items in the singular should be understood to include items in the plural, and vice versa, unless explicitly stated otherwise or clear from the context. Grammatical conjunctions are intended to express any and all disjunctive and conjunctive combinations of conjoined clauses, sentences, words, and the like, unless otherwise stated or clear from the context. Thus, the term "or" should generally be understood to mean "and/or" and so forth.

Recitation of ranges of values herein are not intended to be limiting, referring instead individually to any and all values falling within the range, unless otherwise indicated herein, and each separate value within such a range is incorporated into the specification as if it were individually recited herein. The words "about," "approximately," or the like, when accompanying a numerical value, are to be construed as indicating a deviation as would be appreciated by one of ordinary skill in the art to operate satisfactorily for an intended purpose. Ranges of values and/or numeric values are provided herein as examples only, and do not constitute a limitation on the scope of the described embodiments. The use of any and all examples, or exemplary language ("e.g.," "such as," or the like) provided herein, is intended merely to better illuminate the embodiments and does not pose a limitation on the scope of the embodiments or the claims. No language in the specification should be construed as indicating any unclaimed element as essential to the practice of the embodiments.

In the following description, it is understood that terms such as "first," "second," "top," "bottom," "up," "down," and the like, are words of convenience and are not to be construed as limiting terms unless specifically stated to the contrary.

Described herein are devices, systems, and methods for identity verification, risk reduction for transactions, and authentication of data. Although the following description may emphasize devices, systems, and methods for personal information authentication, the implementations may also or instead be used for other types of entity authentications such as authenticating an autonomous vehicle, a robot, and so forth. Further, the devices, systems, and methods described herein may be adapted for use for authenticating life forms other than humans, including without limitation, pets, wildlife, livestock, and the like. More generally, the systems may be adapted for use with any corporation, company, entity, life form, moveable item, or the like that might be usefully present itself for verification and so forth. In an implementation, any datum or anything that is capable of being authenticated, verified or proven can be used in the various devices, systems, and methods discussed herein.

In several embodiments, the devices, systems, and methods are applied to the "Bitcoin" network which provides a digital cryptocurrency system. However, the devices, systems, and methods may in other embodiments be applied to other suitable networks and environments as well.

Some examples of the various participants in the system are described below.

A user may include without limitation a living person, a citizen, a legal entity, an autonomous vehicle, an autonomous device, a robot, a corporation, an organization, a company or partnership or other legal entity that can execute contracts, an agent or representative, an ambassador, a state, a city, a nation, a county, a party to a transaction, a group, a military, a government, a household, and the like. A user may also be an entity who cannot enter into binding contracts by statute or who has another set of rights different from a natural person. A user may also or instead include a child, a minor, an infant, a pet, an animal, a living thing, a collection of cells, an organism, or the like. A user may be an inanimate object, a parcel, an air, a sea, a land, a space craft, and the like.

An attestor may include without limitation an attestation site or device, a company, a person, a computer-implemented algorithm, a decentralized computing system, and the like. An attestor may include a country, a government, a society, a tribe, a hospital, a birthing center, a census bureau, a parent, a creator, a source, a witness, a neighborhood, a district, a town, a county, a state, a prefecture, a state, a province, a nation-state, a nation, a parliament, a military organization, a family, a community, a government, a militia, a police force, a group, a faction, a club, an ambassador, an embassy, a home, and the like. An attestor may also or instead include an independent third party observer, a natural person, an artificial person, a machine, an online service, a software service, an online application program interface (API), a client-server application, a desktop application, a mobile application, and the like.

A validator may include without limitation a validation site or device, any user or attestor, a border agent, a peace officer, a military post, an officer, a Transportation Security Administration (TSA) agent, a hotel clerk, a merchant, a transaction partner, a seller, a buyer, a credit verification agency, a bank, a store, a partner, a companion, an employee, an employer, and the like. A validator may include someone or something into which a relationship has been entered. A validator may include someone or something into which a relationship is still prospective. A validator may include a potential personal partner or mate. A validator may include without limitation an identity validation service provider, a biometric device, any entity who knows a user personally, a notary, a credit reporting agency, a government, a school, a relative, another user, and the like. A validator can also be a robot, and autonomous vehicle, and the like. A validator may include without limitation someone or something that confirms the validity, accuracy, ownership, or other proprietary aspect of information or property belonging to a user.

A merchant may include without limitation a place of business or commerce that offers products or services to users or other merchants, and who has a need to know with certainty that the user is authentic, and/or that the information presented by the user is authentic and belongs to that user, and/or that the property that the user claims to be their own actually belongs to the user. An identity validation service provider may include without limitation a person or object or business that provides the service of confirming a user's information that the attestor will attest to is valid and real and belongs to the user.

A digital wallet is a collection of keys that controls digital assets or funds. It may allow a user to make electronic commerce transactions easily and securely. A digital wallet may support a multiple-signature (multisig) script, in other words the wallet may be able to take multiple keys to create an attestation address. A digital wallet that will support multiple keys can be called an M-of-N digital wallet. Such a wallet accepts N distinct keys from N different parties, and M of these keys are sufficient in order for the digital wallet system to compute the encryption key in order to perform a transaction. An example of an M-of-N digital wallet is a 2-of-3 digital wallet. M and N can also be the same number, i.e. one (1).

A digital wallet provider is a provider that stores a user's digital wallet on the user's behalf, usually on a remote server, so that the information is easily accessed from anywhere. For the purposes of this application the user can also have their own custom digital wallet that can exist on their own phone or device and not on a remote server. Additionally, the user's own digital wallet can be backed up to a third-party website or service. A third-party cosigner is a party that participates in making a transaction with a multisig wallet that requires signatures from M of N keys before the attestation is finalized and broadcast to the blockchain network.

A site may include without limitation a website, a cloud service, a server, a distributed cloud service, a SaaS application, a decentralized application, a hosted service, an application, a mobile application, or the like. A site may include a banking site, an e-commerce site, a merchant site, a governmental site, a personal site, a social networking site, a messaging site, a search site, a news site, an information site, or the like. A site may include a physical location where a transaction is attempted in person, such as a retail establishment. When a site is a physical location, data may be sent between devices without a local or wide area network, for example through personal area network technologies such as Bluetooth, Near-Field Communication (NFC), sounds, the use of special cryptographic images that get scanned on the screen, and the like. Information may also be sent through wide area networks, such as cellular and other wireless networks. At a site that is a physical location, the exact same mechanism can be used to connect the two end points together, for example where a Quick Response (QR) code tells the device which endpoint to send identity data to. A site that is a physical location may use web based devices, applications, or other devices onsite to read and confirm identity so that it is essentially the same as if it was being done online. A site may also include a location or destination in a virtual world, or may exist in an overlay created with an augmented reality system. A site may move with the motion of a user or be stationary and fixed with respect to a map. A site could be anything or anywhere you want to be identified, for instance a place, real or virtual, where you need to show identity or use identity. Further examples include a Border Crossing or Customs Entry point, a security checkpoint for travel, such as a Transportation Security Administration (TSA) Agent/Checkpoint, a Global Entry Kiosk, and the like. A site may also include specialized systems for comparing data with private databases. For example, at a border crossing site, images that might represent for example a person's fingerprints, may be stored on a phone and then transferred via a secure data transfer mechanism. The site could use these images as though the person had actually been onsite.

An application, also called an app, may include without limitation any mobile, desktop, kiosk-based, cloud-based, home, enterprise, server, client-server, SaaS, embedded, neural, microcontroller-based, firmware-based, chip-based, chemically-executed algorithms, software, procedures, methods, or techniques or the like running on a computing platform that can execute instructions and process inputs to produce outputs. An app may run on a smartphone, tablet, laptop, desktop, in a watch, in a headset, an automobile, a kiosk, a wearable device, a subdermal computing implant, a smartcard, a SIM card, a microcontroller, or the like.

A communication channel is any method of exchanging information between two parties. This could include a wired link, a wireless link, a person to person wireless link such as Bluetooth or NFC, or an in-person exchange. It is understood that there is a plethora of different protocols that can be used to exchange information over a communication channel. A preferred communication channel is the communication channel that a user chooses to use before trying other communication channels. The preferred communication channel may be context or circumstance dependent.

Information may be or include personal information, personal identification information (PII), data or user data, and may include without limitation any personally identifying data or representations of personal information. Personally identifiable information (PII), or sensitive personal information, especially as used in U.S. privacy law and information security, is information that can be used on its own or with other information to identify, contact, or locate a single person, or to identify an individual in context. Personally identifiable information may include one or more information items, including full name, home address, telephone number, social security number (SSN), credit card numbers, date of birth, birthplace, driver's license number, e-mail address, national identification number, passport number, user ID, login name or usernames in messaging, social media, and other applications, passwords or personal identification numbers (PINs), IP addresses, vehicle registration plate number, face, fingerprints, retinal scan, handwriting samples, biometric data, digital identity, and genetic information.

Information may include physical documents representing personal information, such as passports, social security cards, green cards, driver's licenses, college degrees, diplomas, training certifications, marriage licenses, court documents, titles, deeds, chains of title, and the like. information may include the data contained in physical documents, the data represented by those documents, any data proven by those documents; the identity of a person, the names of a person; the status of a person with respect to statutes such as minor, adult, emancipated minor, resident alien, citizen, dual citizen, male, female, uni-gendered, bi-gendered, non-gendered, veteran, retiree, pensioner, alumni, widower, parent, child, relative, indigenous race, native, protected class, member of a club, group, society, or service, and the like. information may also include authenticating metadata about any such personal information, proofs or attestations from others about the validity of that information, and the like.

As is known in the art, asymmetric or public key cryptography uses public and private keys to encrypt and decrypt data. The keys are large numbers that have been paired together, but are not identical, and are called a cryptographic asymmetric key pair. One key can be shared with everyone, and this is called the public key. The other key in the pair is kept secret, and is called the private key. Either of the keys can be used to encrypt a message; the opposite key is used to for decryption. Different system participants all may have a public key. For example, an attestor may have a public key, a verifier may have a public key, and a third-party cosigner may have a public key.

A cryptographic hash function or "hash" is a mathematical algorithm that maps data of arbitrary size to a bit string of a fixed size. It is designed to be a one-way function. The only way to recreate the input data from an ideal cryptographic hash function's output is to attempt a brute-force search of possible inputs to see if they produce a match.

A digital cryptocurrency is a medium of exchange similar to normal currencies, but designed for the purpose of exchanging digital information. Cryptography is used to secure the transactions and to control the creation of new units of currency. The first, and best known cryptocurrency is Bitcoin.

Digital cryptocurrency dust or "dust" refers to a very small or the smallest possible transaction. Too many very small transactions would congest network resources, so the network typically charges a transaction fee to process small value transactions. In the context of this application, dust is the smallest possible value required in order to achieve a transaction. It may not be a fixed amount. This small currency amount is distinct from the transaction fee. Dust refers only to the minimum financial amount of cryptocurrency as per the rules associated with the specific distributed ledger (for example, but not limited to, the Bitcoin network). The fee charged for processing such a transaction might be a fixed fee or might be a percentage of the transaction size or may be determined by some other method. Some distributed ledgers might not have a minimum transaction size and might not charge a transaction fee. In general, dust may have no financial value and could be any parameter that is required for a valid transaction to propagate through the network.

A transaction is used to transfer an amount of cryptocurrency (e.g. dust) that contains all necessary attestations, moving data between different keys or different digital wallets. A transaction is always for the purpose of creating new hashes and putting them in a user's digital wallet, or for revoking previously-attested data and removing such data from a user's digital wallet.

A digital ledger is a digital record of who-owns-what. A centralized ledger or centralized database is a system where data is stored in a master database with a single point of control. There is a gatekeeper party that alone acts on behalf of clients to modify the system state. Bitcoin makes use of a distributed ledger called a blockchain. A distributed ledger is fundamentally different from a centralized ledger. In a distributed ledger, any party on the network has access to the ledger. Authorization, rather than being a function that is added onto the system at the end, is built into the lowest level of the stack. The distributed ledger is replicated among many different nodes in a peer-to-peer network, and a consensus algorithm ensures that each node's copy of the ledger is identical to every other node's copy. Asset owners must use cryptographic signatures to make transactions on a digital ledger.

An attest key is a key that is created using hashed data which consists of or is derived from information, combined with a public key. The information that is hashed and used to create the attest key may be something as simple as the user's name. In one embodiment, the hashed data used to create the attest key may be a combination of information, such as a user's name and date of birth. In one embodiment, the hashed data used to create the attest key may be comprised of derived data. For example, the user information may include a person's date of birth, and the hashed data includes not only the date of birth, but also a statement or indication that the user's age is greater than 21 years. The creation of the hash of the data for the attest key may be performed using a merkel tree solution, a one-way accumulator, or any other suitable cryptographic algorithm that could create a one-way or irreversible hash.

A public attest key combines the aforementioned hashed data, comprising or derived from the user information, combined with a public key.

A private attest key combines the aforementioned hashed data, the data comprising or derived from the user information, combined with a private key.

An attestation address is the address at which the transaction can be found on the distributed ledger. For a single signature transaction, a hash function can be applied to the public attest key. In some embodiments, the hash function is the P2PKH algorithm. An attestation address may be a multisig attestation address, which in one implementation is a result of the public attest key being signed with the attestor's public key and the public keys of all cosigners according to an M of N multisig redeem script cryptographic signing protocol. Potential cosigners can include, but are not limited to, the wallet provider, the attestor, and the recovery public key for the user's wallet. Funds sent to the attestation address may only be spent or revoked if M-of-N cosigners sign a transaction spending from the attestation address. In another implementation, the multi signature process is achieved by creating a contract stating the number of and actual public keys required. In another implementation, a multisig attestation address comprises two or more public keys and is created using the Pay to Script Hash (P2SH) protocol. According to some embodiments, a redeem script is generated using the public keys of the multiple signatories, the resulting redeem script is serialized to create a serialized output. A hash function, such as the SHA256 algorithm, is applied to the serialized output to create a second hash. Subsequently, a further hash function, such as the RIPEMD160 algorithm, is applied to the second hash to generate the attestation address.

A digital signature is used to verify a message. The attestation address is a digital signature. A party can check that the attested information is genuine by hashing the message with a public key, verifying that a signature was produced from a party controlling a private key that is represented by a known public key. This is a standard implementation of ECDSA to compare signatures. A certificate may be used to bind public keys to persons or other entities, i.e. to provide assurance that the public key belongs to the entity. The certificate itself is typically signed by a trusted third party or Certificate Authority (CA), for example, Verisign.

A cryptographic nonce is an arbitrary number used only once in a cryptographic communication. The nonce may be a random or pseudorandom number, or may include a timestamp to ensure that the nonce is only used once. The cryptographic nonce may be used to introduce more entropy into a hash. Hashed user data which is used to create the attest key may be placed in a predetermined or standardized format for consistency for when it is hashed again in the future.

Various novel system protocols will now be described. In the context of the devices, systems, and methods described herein, a user may have information they wish to convey to another party, with the desire that the other party trust or rely upon the validity of the information. To establish this trust, the user and the other party may participate in an information delivery protocol that assists the other party in deciding if the user's information is authentic, valid, or actionable. The other party may perform a verification protocol as part of the information delivery protocol.

In an aspect, an attestation protocol may be performed by an attestor to attest to the validity of the information provided by the user. The attestor may perform the attestation protocol, in order to authenticate the user's information and to create an attestation transaction on a centralized or distributed ledger, which serves as a certification that the user's information has been authenticated. As part of the attestation protocol, the user's key is serialized and available in the attestation transaction. Just as a traditional Certificate Authority may be considered a form of key exchange, the protocol can be used for ephemeral key exchange, as is used in encrypted communications. As part of the attestation protocol, once an attestor has learned and has validated the identity of a user and/or the user's information by performing a validation protocol, the attestor may certify the user's information and associate it with the user's validated identity by using a signing protocol, which creates an attestation transaction comprising the user's information onto a centralized or distributed ledger.

In one embodiment, the attestation protocol requires the attestor to apply a cryptographic hash function, such as the SHA256 cryptographic hash function, to data comprising some or all of the user's information or data derived from some or all of the user's information. The attestor then combines this "hash" of the data derived from the user's information with the user's public key to create the attest key. As part of the attestation protocol, a validation protocol may be performed by a validator. The validation protocol describes how the validator authenticates the information provided by a user to an attestor. The validator may, for example, inspect the information provided by the user. The validator may employ multi-factor authentication to ascertain that the user controls the user's provided communication channels. The validator seeks to establish a degree of confidence that the user is who they claim to be, or that the information the user wishes to convey to another party is authentic, or that the user has control or possession over the property or rights they assert. The attestor may perform the role of the validator, or the validator may be a third party, distinct from the attestor and the user. In one embodiment, both the attestor and a third party may perform different functions of a validator. The attestor may, as part of the attestation protocol, with or without the cooperation of a third-party cosigner, create an attestation transaction on a centralized or distributed ledger representing the attestor's attestation to the validity of the user's information. Where there is no third-party cosigner involved in the attestation protocol, the location of the attestation transaction in a centralized or distributed ledger is called the attestation address. Where there is one or more third party cosigners involved in the attestation protocol, the location of the attestation transaction in the centralized or distributed ledger may be called the attestation address or the multisig attestation address.

When some user information has already been attested to, and now the user wants the attestor to attest to more information, the novel approach allows for an addendum to be added to the already attested data. Because of how the attest key is generated, the user information is contained in a record which is a transaction that can be spent. In order to modify this attestation, the transaction can be spent back to the same address and can be combined with new information into a new transaction. In one embodiment, an entirely new transaction can be entered onto the distributed ledger, which would allow the changing of data that was previously attested to.

Similarly, if the user wanted to revoke only part of the attested information, then the transaction may be revoked by spending the dust, and a new transaction with updated user information may be written. This allows attested information to change, for instance, if the user moves and has a new home address, or changes their telephone number.

As described earlier above, the creation of the hash of the data for the attest key may be performed using a merkel tree solution, a one-way accumulator, or any other suitable cryptographic algorithm that creates a one-way or irreversible hash. This is effectively the data model for creating hashes representing the data being attested to. This allows for the storage of multiple attestations, and variations of the attestations, in a single transaction. For example, one may store a birthdate, as well as day, month, and year, all within a single hash, yet provide only the one requested plus all the other hashes to resolve the hash that is ultimately stored.

Revoking or editing doesn't change how this works. For example, if one needed to update the address, a completely new transaction with the updated address would be created and compiled using one of the specified hashing algorithms, which revokes the old data. The dust is spent at a new address in the user's control. This effectively revokes the old data (as it will now be spent) and creates a new attestation. Revoking a part of a key transaction is exactly the same as compiling a new hash with only the attested data, but excludes the revoked components from the tree or accumulator or other utilized mechanism. Advantageously, the use of either merkel trees, accumulators, or other suitable mechanism allows for a reduction in or minimization of the number of transactions required to store the attestations on the ledger or blockchain. This is not required, however, and could also be done by simply creating a hash for each individual item being attested to. One could imagine, however, that if an example containing age and various components of a birthdate, one would need at least five individual transactions instead of just one transaction.

The current state of the art for storing data on the Bitcoin blockchain is to use OP_RETURN. OP_RETURN is a script opcode used to mark a transaction output as invalid. Since the data after OP_RETURN is irrelevant to the payment system of Bitcoin, arbitrary data can be added into the output after an OP_RETURN. Currently, the default Bitcoin client relays OP_RETURN transactions up to 80 bytes, but does not provide a way for users to create OP_RETURN transactions. Some members of the Bitcoin community believe that the use of OP_RETURN violates the contract of Bitcoin, since bitcoin was intended to provide a record for financial transactions, not a record for arbitrary data. The practice using OP_RETURN continues for now because OP_RETURN is reasonably efficient in terms of data bytes stored as a fraction of blockchain space consumed. However, one drawback is that there is a strong sentiment against using certain blockchains for the purpose of storing data. This means that the tolerated but invalid transaction may not always be available for use.

In contrast to storing data with use of OP_RETURN, storing information in an attestation transaction as described herein has the significant advantage that it is safeguarded against changes in the bitcoin protocol, as theoretically the bitcoin community could remove the ability to use OP_RETURN.

An additional advantage of using the attestation protocol to store information relates to the unspent transaction output cache. When OP_RETURN is used, there are no entries created in the unspent transaction output (UTXO) cache. This makes it much harder to locate the information on the blockchain. Additionally, since there is no currency associated with this transaction, once the transaction is on the blockchain, it only represents data and can no longer be spent. Therefore, the data cannot readily be revoked or updated. In contrast, storing information in an attestation transaction as described herein has the significant advantage of making it easier for people to check if a transaction is still valid. In order to find a valid transaction, a party simply has to look in the UTXO cache. If the transaction can be found there, then the transaction (i.e. the attestation) is still valid.

On the other hand, transactions using OP_RETURN to store data cannot be spent, as they are not actually valid transactions. Therefore, the data associated with OP_RETURN do not exist in the UTXO cache. That means, in order to revoke information that was stored using OP_RETURN, a revocation OP_RETURN transaction would have to be placed on the blockchain (and the party would need to know how and where to find it) or a third-party system would need to be referenced. In other words, the only way to revoke or update data stored on the blockchain using OP_RETURN is to find another similar record on the blockchain that updates the first record, which would be difficult and time consuming.

One novel technique described in the present disclosure realizes a different way of storing data on a blockchain, through the creation and use of an attest key. The attest key approach described herein is compatible with the secure bitcoin blockchain system, and with all existing standards as well as the Bitcoin Implementation Protocol. This means that the attest key approach, because it doesn't violate any protocols, is viable today and permanent. The attest key approach is also usable with other distributed ledgers.

Furthermore, the attest key approach is inexpensive. In hashing user information with a key to create the attest key, which is a new key, the length of the data record is not increased. Storing a longer data record would mean that one would need to pay more to have the record processed such that it could be added to the blockchain. Another advantage is Unspent Transaction Outputs (UTXO) as previously described. To keep track of the pool of UTXOs, you only need to store a subset of the distributed ledger, which is a big advantage for mobile or portable devices. In another aspect, use of an attestation protocol, a validation protocol, a verification protocol, or any combination of these protocols, may reduce the complexity of a user logging into sites and performing transactions between users and site owners. A user attempting to log in to or create a new user identity or authenticate an existing user identity at a site may use an application to log into the site. Using the application, the user may perform this function by scanning or recording still or animated content at that site, provided by the site. That action immediately just logs them into the site and passes the site all the data that it requires. As this data is attested to, the site is able to verify the information using the verification protocol, and then knows it is getting authenticated information (the information is authenticated by the attestor who signed the attestation transaction on the distributed ledger). Because the information is attested to, the site can trust the information more, which reduces or eliminates the amount of verification that the site needs to do. This also means that the user experience is simplified as they don't have to type all the info again to do things like open accounts, enter financial information, etc.

In another aspect, an attestation protocol and/or a validation protocol and/or a verification protocol may be used to transfer data belonging to a user. One example might be a user's medical records. These records may be tied to the user and stored on the user's mobile device. The user can use the protocols described herein to send this information to a recipient. In general, the protocols described herein can be used to transfer any data for any purpose in a trusted and secure manner.

User information does not always have to be authenticated by a third party attestor. Self-attestation of information is possible, and any information can be transferred using the protocols described herein. It is up to the recipient of the data to decide what level of trust is required for each item of data received. The data transferred does not have to be attested to in any way on the blockchain, as that is needed only in the case when the user wants to verify independent attestation.

In another aspect, a user goes to make a business transaction, for example but not limited to, purchasing a product at a site where the user does not have an account and does not want to open an account. The site may be, for example, a store or an e-commerce site. The site displays an icon or other indication that the user may make their business transaction or purchase using the attestor. The site may display a barcode or a QR code or some other code that can be scanned by a user's device, or the site may otherwise communicate with the user's device. If the site displays a code that can be scanned, the user may scan the code with their mobile device. The user may open an application from the attestor to scan the code. The user may have an attestor application that is running in the background and that can detect if there is direct communication between the site and user's device.

The user's device, through the attestor application or through other means, establishes a direct link to the site that is looking to verify the user to allow the user to make the business transaction or purchase. The direct link may be a URL. Through this direct link between the user and the site, the user's information and the user's public key are transferred from the user to the site. Through this direct link, the site sends a cryptographic challenge nonce to the user for the user to sign with their private key, and the user sends the signed cryptographic challenge nonce back to the site. The site is able to use the signed nonce and the user's public key in order to verify that the user is in control of the private key that was used to sign the original attested information. The site is further able to combine the user's information with the user's public key to create a public attest key, and then is able to use this public attest key to create an attestation address, and thereby verify the existence of the original attestation transaction on the blockchain. The site is therefore able to approve the business transaction or purchase, where the user did not have to open an account.

The user may also or instead receive, from the site, information identifying that site by another means, such as but not limited to a QR code or a moving image, for example audio, a wireless networking protocol, radio frequency signals, or visual spectrum data transmission techniques. The user may also or instead enter an address such as a uniform resource locator (URL). The application may allow the user to select only the user information they wish to provide to the site, or the application may tell the user what specific information the site is requesting and enable the user to allow that information to be provided to the site. The user may, using an application or directly with the site, according to a verification protocol, provide the specific information and public keys to the site and the site may, following the verification protocol, be able to immediately and without requesting further information from the user, allow the user to log in, create a new user identity, or authenticate an existing user identity with the site. The site may be able to allow these or other user functions, such as the transfer of data, without consulting any attestor directly, because the verification protocol may not require involvement of an attestor at the time that user verification is needed, yet the verification protocol may provide a provable, auditable positive verification of the authenticity of the user's information.

In another aspect, because of the ability to incorporate multi-party signing in the attestation protocol, a site may still be able to verify the authenticity of a user's information if an attestor's security is compromised and even if an attestor ceases to operate, e.g., due to bankruptcy or abandonment. A site may be able to continue to locate an attestation transaction in the centralized or distributed ledger according to a verification protocol until such time as the attestation of the user's information is revoked via a revocation protocol.

In another aspect, an attestor may, in cooperation with a user, or in cooperation with a third-party cosigner to the user's attested information but not alone, use the revocation protocol to revoke an attestation for a user's information. A user can do this with cooperation of an attestor or a third party, and a third party can do it with cooperation of the user or the attestor. In general, transactions can require M of N signatures, or just one signer. It may be the case that an attestor does not want to have revocability, and leaves it entirely up to the user to manage and revoke their information. In this case, the attestor simply sends a standard transaction to the user. In one embodiment, the attestor might want multiple parties to have to concur when revoking an attestation, for example 3 of 5 parties.

In another aspect, even if an attestor is compromised, no fraudulent attestations of user information may be performed because an attacker still lacks the user's and third party cosigner's private keys. In other words, even if someone got control of the attestor's keys to sign transactions, they couldn't independently go and issue fraudulent attestations on the distributed ledger because they would need a second signature in order to do so. The second signature would be that of the third party digital wallet provider or the user who owns the data.

The verification protocol is now described. A user may submit information to a third party in response to a third-party data request, and the third party (the verifier) needs to verify the authenticity of this user information. The verifier may, without a need to contact a central provider of trust, employ a verification protocol to verify information provided by a user, where the user has previously had the information attested to by an attestor as part of an attestation protocol. Using for example, one or more of an application, a website, and an attestor API, the verifier may satisfy itself that the information provided by the user is authentic by re-deriving the attestation address of an attestation transaction, and seeing that the attestation transaction exists in the centralized or distributed ledger at the attestation address. A verifier may provide unique, time-sensitive information, such as a cryptographic nonce, to the user who then may sign the information using the signing protocol with the user's private key as may be required. The verifier may, in this way, ascertain that this attested information belongs to the user or that the user's private key is in the current control of the user. The verifier ascertains this by verifying the signature using the public attest key corresponding to the attestation transaction associated with the user's information. The attestation transaction should spend some amount to the attestation address, confirming that the transaction is signed by a trusted attestor's key, which affirms that the transaction in the centralized or distributed ledger is valid, and that the proffered user information is authentic.

In another aspect, a user may want to keep track of when their information is accessed or used and may want to be able to proactively authorize or deny the invocation or use of that information. An attestation site, website, or application controlled by an attestor may allow a user to register and create an identity and to submit their information such as a social security number. The attestor may perform an attestation protocol in order to authenticate the user's information and to create an attestation transaction on a centralized or distributed ledger, which serves as a certification that the user's information has been authenticated. The attestor may also perform a validation protocol to ascertain that the user is not fraudulent and that the submitted information is authentic. The validation protocol may use third party Identity Validation Service Providers such as ThreatMetrix® to authenticate the user's information. An attestation site website, or application controlled by an attestor, performing a validation protocol, may call, text, phone, message, or send physical mail to addresses provided by the user. The attestation site, website, or application controlled by an attestor performing a validation protocol may receive pictures or scans or radio frequency identification (RFID) readouts or infrared captures of user's identifying documents. An attestor performing a validation protocol may receive authenticated information or biometric information from a device, which could be a user device, or perhaps a fingerprint reader at an FBI certified fingerprint collection point, which may be an attestor.

An attestation site, website, or application controlled by an attestor may provide an API to other third party sites so that the third-party sites can notify a user via an attestor application or website, in a proactive manner, when the user's information is being accessed. For instance, a bank site may be allowed to get a hold of a user by sending the SSN of the user to the attestor. Because the attestor has an app key for the user, the attestor can send the user an alert over a communication channel saying that their SSN is being used.

As an example, a user may attempt to apply for credit at a banking site online or offline. A user may provide a social security number (SSN) to the banking site. The banking site may use the attestation API to submit the SSN to the attestor. The attestor may use preferred contact information it has for the authenticated user of that SSN in order to reach out to that user and verify that the user intended to apply for credit. The attestor may require the user to affirmatively communicate a response to the attestor or to the third party (in this case the banking site) authorizing or denying the application for credit.

In another aspect, any of the attestation protocol, validation protocol, or verification protocol described herein may be used instead of a traditional certificate authority (CA) vendor. More broadly, these methods and protocols are generally used for attesting to the authenticity of a company and putting this attestation on a centralized or distributed ledger. Issuing an identity for a company does not have to be purely for replacing CAs. The process of validating a company and putting it on the blockchain could have many applications which include but are not limited to using the attested company data in web transactions in place of a standard certificate. More generally, any entity can have information validated and attested to and stored on a centralized or distributed ledger in this way, and any two entities can use the verification protocol as a way to communicate information to each other in a way that can be trusted. In some embodiments these protocols and methods can be used from website to website, from a server to an API, from one appliance to another appliance, and so on. The user and parties described herein are non-limiting examples of the possible uses of these methods and protocols, and the protocol works for any user or party that has a need to prove its identity.

The attestation transaction that an attestor and user creates using these protocols may be used to provide a prospective communication partner or transaction partner with positive identification of a digital entity, such as a merchant website or financial institution, in lieu of a central authority. As a result, participants in a transaction or communication using the protocols described herein may be able to use key exchange techniques as known in the art and thus establish encrypted communication without relying on a CA vendor. For example, the attestor may provide an identity to a site, and then a user would be able to use the exact same mechanism to identify the site as valid, in the same way the CA certificates are trusted now. For example, an attestor may combine the company name and other company information to create an attestation transaction at an attestation address. The attestor validates the company's credentials and ensures the company is legitimate, and the attestation transaction becomes proof that this company has been validated by an attestor. The company may then put the information used in the attestation on its website. A user that wants to verify the company's identity may use the information that the company puts on its website and the verification protocols described herein to check that the attestation transaction exists at that attestation address. This technique obviates the need for a certificate revocation list (CRL) or the use of the Online Certificate Status Protocol (OCSP). Company information can be attested to in the same manner that personal information can be attested to. According to the disclosed system and methods described herein, company would apply to an attestor for attestation, instead of conventionally applying to a certificate authority. The attestor would validate the company information and create an attestation transaction using the company's public key (their certificate) and the company information. The company could then, for example, display a code on their website which indicates that their company has been attested to via an attestor. In one embodiment, the company would also put the information that has been attested to on their website. In one embodiment, nothing would be displayed on the website. The website would pass the company details to the user's browser. In one embodiment, the user's browser would be updated to support the verification protocol or a plugin would have to be installed. The user's browser would receive the information from the website (i.e. company name, etc.). In one embodiment, the transaction would be initiated by the user's browser. The user's browser may send a nonce to the company's site and request the site to send the company name, the signed nonce plus any additional details needed. The company site would send these details. The user's browser would use the verification protocol to recreate the attest address as described herein in order to establish the validity of the information received. In one embodiment this would be an automated process without a need for accepting of the transaction or any manual intervention. In one embodiment the user may use the signed cryptographic challenge nonce to verify that the company is in control of their private key, using methods as are known in the art. Any of the above steps may be performed by an attestor on behalf of the user or the company. In one embodiment, the company information that is used to create the attest key is standardized, in that way the information that any company would use to create an attestation transaction to represent their validity is consistent with respect to data fields and types.

In another aspect, any of the attestation protocol, validation protocol, or verification protocol described herein may be used in conjunction with established centralized or distributed ledger features of cryptocurrency and blockchain to record attestation transactions. Two parties wishing to exchange a good or service or title might ordinarily wish to record such a transfer in a centralized or distributed ledger, but the parties lack certainty or assurance that the other party are who they say they are, or that the other party actual owns the good or can offer the service or possesses the title. A user may use the protocols described herein to provide attested proof of their identity and to further provide attested proof of ownership or control, thereby satisfying all the conditions required for the exchange to proceed.

In another aspect, users may create accounts with an attestor and create attestation transactions in person. A kiosk or station, similar to an automatic teller machine, may be situated in a bank or supermarket or other retail location. This kiosk may serve the function of an attestor, a verifier, a validator, or may implement all of these functions. users desiring to create an account with an attestor and create attestation transactions with their information may use the kiosk, which would allow the user to participate in attestation protocols or validation protocols by entering contact information and/or by presenting other verifying information or identity-proving documentation. The attestor kiosk or station may be equipped with a front-facing camera so that the user may be photographed in order to use facial recognition techniques as part of the validation protocol. The camera may be used in order to establish a real-time video conference between the user and an attestor or validator located remotely from the kiosk. For example, a remote validator performing the validation protocol may use, for example, a set of credit bureau challenge/response queries, based on the user's social security number or any other national or regional identification number, in the execution of the validation protocol to authenticate the user. As part of the validation protocol, the user may type in or speak the responses to the challenge/response queries. The user may hold up identity documents to the camera. The user may also be required to insert identity documents into specialized readers that can read documents such as passports, driver's licenses, or other identity documents. The attestor kiosk or station may use a combination of automated fraud detection and remote user intervention or interaction. The attestor kiosk or station may employ a remote attestor or validator without highlighting that fact to the user seeking authentication, for example in order to supervise the activity of the user presenting identity documentation.

Upon successful completion of the validation protocol for the user, the attestor kiosk or station may trigger the creation of one or more attestation transactions that attest to the validity of the user's information that could be positively authenticated. Specific information about the newly created attestation transactions may be sent to the user using any of the user's communication channels, or may be presented to the user on the screen of the kiosk. The attestor kiosk or station may present a QR code or other motion code to the user, prompting the user to download an attestor's application on the user's mobile device. The user may then use the attestor application on their mobile phone or device to scan additional QR or motion codes in order to receive any generated public keys, private keys, or public or private attest keys related to the one or more attestation transactions of their information.

In one embodiment, the attestor kiosk or station may cause the user to install the attestor's application before attestation protocol and validation protocol is initiated, such that, for example, the user's information and any private keys required for the attestation transaction are generated and stored only on user's mobile device and not in the kiosk and not at the attestor. The attestor kiosk or station, or the attestor application may cause the user to install a digital wallet application on the user's mobile phone or device. The public keys, private keys, or attest keys may be stored in the user's digital wallet. The user's information may be stored in the user's digital wallet. If the user has more than one digital wallet application, the user may be prompted to choose the digital wallet in which they want to store the keys and/or the information, and the aforementioned functions may instead be implemented by an in-person teller instead of a kiosk. This in-person teller may act as a validator and/or an attestor.

Examples of notification systems will now be discussed. In the context of the devices, systems, and methods described herein, an attestor may have an attestation site or application which may provide an attestation API to allow authenticated users (users for which an attestation transaction on a centralized or distributed ledger exists) to be communicated to by other sites which have a need to collect or verify specific information about that user. The attestation API may provide access to the attestation site or application or a different site or web service that enables merchants or banks or other users to offer extra security or other services when performing transactions with authenticated users. When a user attempts a transaction with a merchant or bank or other user, for example applying for credit, the user may provide to the merchant, bank or other user their attestation site or attestor information in lieu or providing the personal information, for example their ordinary contact information, their address, their birthdate or their social security number. The attestor application on the user's mobile device may provide the attestation site or attestor information to the merchant, bank or other user in lieu of the user providing this directly.

In one embodiment, the user may provide their attestation site information in conjunction with other ordinary information. As the merchant or bank or other user is attempting to run the credit check for the user, it may use the attestation API to convey to the attestor the attempt to access or use the user's information. The attestation API may also allow the merchant or bank or other user to communicate, directly or through the attestor or the attestor application, to the user that someone is trying to access or use their user information and the purpose that the user information was provided for. In this example, the user is informed that their SSN is being accessed or used for the purpose of opening new credit. The attestor or the attestor's application or the merchant, bank, or other user or an application of the merchant, bank, or other user, may provide a prompt for the user to allow or deny the transaction through an application, voice message, text message, or any other communication channel. The use of the attestation API may provide merchants and banks and other users a reduction in the amount of fraud and may provide a higher sense of security for users about their information.

In an aspect, an attestation site or application may provide an API to allow any of its authenticated users to be communicated to by other sites which have information about that user but lack a direct means of contacting the user because they don't know any of the user's communication channels. An attestation site or application may provide this API for a fee. An attestation site or application may control the frequency or volume or types of communication to be sent to users according to user preferences or attestation site policies. An attestation site or application may prevent user communication channel information such as means of contacting the user from being revealed in this API.

Because of the chance of unsolicited information being transmitted to authenticated users of the attestation site from other sites, the attestation site may perform spam filtering and unsolicited communication filtering on an aggregate basis to incoming communication. The attestation site may also require the other site to provide enough information relating to the user they are trying to communicate with in order to establish that there was a pre-existing business relationship between the other site and the user. Additional authentication steps may be performed on the other site, similarly to how they are performed on users, in order to authenticate the site attempting communication. The notification approach described herein may provide a novel way for users who have registered with the attestor to receive critical communications from parties who lack correct or updated communication channel information for a user, but who may have a legitimate need to communicate with the user.

FIG. 1 is a diagram illustrating a system 100 for use in providing authentication of information, such as personal identification information of a user. As shown in FIG. 1, the system 100 may interconnect a plurality of participants (e.g., devices, systems, components, resources, facilities, and so on) in a communicating relationship via one or more communication networks 190. The participants may, for example, include a user computing device or user 110, an attestor site or device or attestor 120, an identity validation site or device or validator 130, and a verifier site or device or verifier 160. Verifier 160 may be a merchant, a bank, or other entity in need of verification of user identities. Other entities in the system 100 include a digital wallet provider site or device or digital wallet provider 140, as well as a third-party cosigner computing device or third party cosigner 112.

Some or all of the participants may have access to a centralized or distributed ledger 150. Centralized or distributed ledger 150 is an electronic ledger which contains a list of verified transactions of digital cryptocurrency. In Bitcoin, centralized or distributed ledger 150 is a distributed ledger which is referred to as a blockchain. Although transactions are communicated over the Bitcoin network for entry into the blockchain, participants referred to as "miners" may ultimately be the entities that perform transaction verification and blockchain entry.

The system 100 may include one or more additional or alternative attestors 120, which may be private or public entities. An additional or alternative attestor may be a provider of actual sources of identification for users. For example, an additional or alternative attestor may be or include a site or device of a government entity designated to issue sources of user identification (e.g. a government office which issues passports, a Department of Motor Vehicles or DMV which issues driver's licenses, etc.). The system 100 having one or more communication networks 190 may utilize any data network(s) or internetwork(s) suitable for communicating data and control information among participants in the system 100. This may include public networks such as the Internet, private networks, and telecommunications networks such as the public Switched Telephone Network or cellular networks using second generation cellular technology (e.g. 2G, GSM, or EDGE), third generation cellular technology (e.g., 3G or IMT-2000, UMTS, or WCDMA), fourth generation cellular technology (e.g., 4G, LTE, LTE-Advanced, E-UTRA, etc. or WiMAX-Advanced (IEEE 802.16m), 5G cellular technology, peer-to-peer and personal area network technologies such as Bluetooth, Bluetooth LE, Wi-Fi Direct, LTE Direct, NFC, and/or other technologies, as well as any of a variety of corporate area, metropolitan area, campus or other local area networks or enterprise networks, along with any switches, routers, hubs, gateways, and the like that might be used to carry data among participants in the system 100. The network may also be a high bandwidth, high-latency network such as 'sneakernet', where information on a mass storage device is hand-delivered or delivered via a mailing service such as DHL®, a national postal service, FedEx®, UPS®, or the like. The network may also utilize a visual data channel, such as barcodes, 2D barcodes, quick response (QR) codes, motion QR codes, or any form of animated visual information that can be captured by a visual capture device in a computer or portable device. The network may also utilize an audio channel to deliver information encoded in watermarked or fingerprinted audio such as those provided by Shazam® or the like. System 100 may also work in with an intermittent network connection or in a disconnected, offline mode. The network utilized may also include a combination of data networks, and need not be limited to a strictly public or private network. The devices, systems, and methods may further communicate using the "Bitcoin" network, which includes a plurality of nodes operating in accordance with a peer-to-peer (P2P) bitcoin protocol over the Internet.

The participants in the system 100 may each include network interfaces or the like for communication over the network. The network interfaces of the participants may allow for real time data synchronization between any of the participants, either on a shared network basis or on a peer-to-peer basis directly between the participants.

Part or all of the centralized or distributed ledger 150 may be downloaded or cached by any of the participants in the system 100 for offline use. Any of the parties may download the centralized or distributed ledger 150 on a periodic basis when they are connected online. The centralized or distributed ledger 150 may be delivered on a periodic or one-time basis to participants via postal mail, delivery service, or private delivery channels operated by the participant. In an embodiment, the Bitcoin blockchain may be used as the distributed ledger 150. In another aspect, a different distributed, centralized or decentralized ledger 150 may be used instead of the Bitcoin blockchain. The centralized or distributed ledger 150 may be accessed from a cached offline store. A relevant subset of the centralized or distributed ledger 150 may be provided by an attestor 120.

Figure 2:
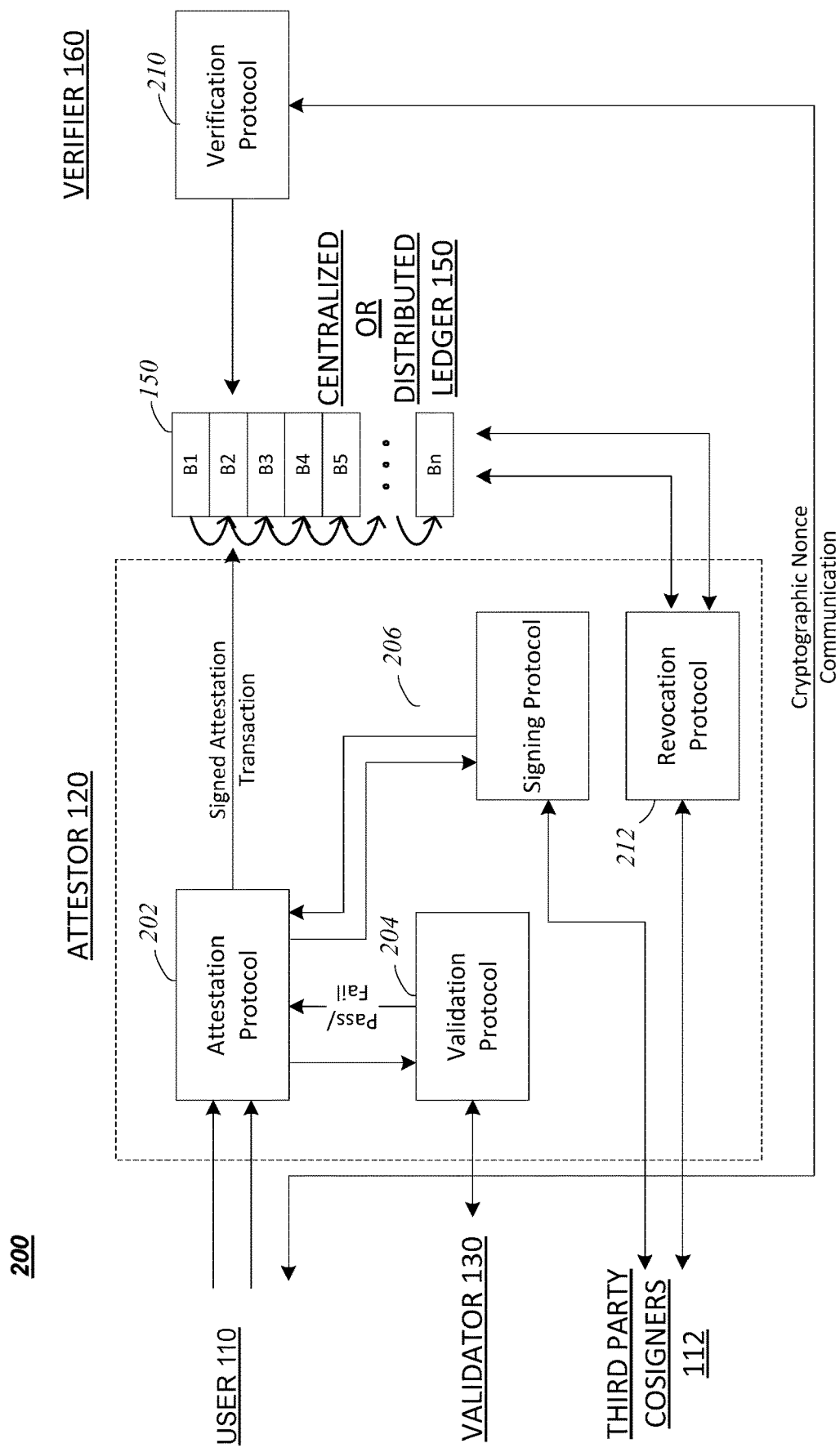
FIG. 2 is a diagram illustrating various protocols which may be used for the attestation and verification of information in the system in accordance with exemplary embodiments of the disclosed subject matter.

FIG. 2 is a flow diagram 200 illustrating various protocols which may be used for providing authentication of information, for example personal identification information or "PII" in the system of FIG. 1, the various protocols including an attestation protocol 202, a validation protocol 204, a signing protocol 206, a verification protocol 210, and a revocation protocol 212.

Initially, cryptography is utilized to create a key pair for the user 110. The creation of a key pair includes the creation of a user private key and a public key. The key pair may be created using elliptic curve cryptography, such as described in *Guide to Elliptic Curve Cryptography* (Springer Professional Computing) ISBN-13: 978-0387952734, which is hereby incorporated by reference herein in its entirety.

The user 110 may provide the user's pubic key to the attestor 120. In an aspect, the user 110 may also provide the public key of a third-party cosigner to the transaction. The third-party cosigner may be a digital wallet provider (e.g. digital wallet provider 140 of FIG. 1), for example, a bitcoin wallet provider, or any other entity that can provide a public key for the transaction. There may be multiple third-party cosigners (e.g. third party cosigner 112 of FIG. 1), bringing the total number of keys to N. In one embodiment, the collection of public keys is later used to create the attestation address using a multisig transaction. In this case, the attestation transaction may only be revoked (i.e. the funds at this attestation address may only be spent) with a multisig transaction where M of N keys are provided. In this way, it is not possible for a single party to revoke the attestation. As shown in FIG. 2, the attestor 120 may receive information from the user 110, in a request to perform attestation using an attestation protocol 202. The information from the user 110 may be personal identification information or "PII" that may uniquely identify the user 110. In general, the attestation protocol 202 causes the information (e.g. the PII) from the user 110 to be validated and attested to with use of signing protocol 206.

Upon receipt of the information, the attestor 120 will initially attempt to confirm the authenticity of the information using a validation protocol 204. This validation protocol 204 may be performed by a validator (e.g. validator 130 of FIG. 1). The validator may be the same entity as the attestor 120 or it may be a separate entity, such as a third-party identification service provider. The validation protocol 204 may include any suitable validation steps to validate the identity of the user 110. The validation protocol 204 may include conventional validation steps using any contact information or communication channels provided by the user 110. These steps may include communications such as texting, e-mailing, calling, or messaging the user 110 with the provided contact information. The validator may send messages out on any communication channel provided by the user 110 or known to belong to the user 110. The validator may send a physical postcard or mail to a physical address provided by user 110, and require the user 110 to enter a code provided on the physical postcard or mail on an attestor's site or application in order to continue with or complete the validation protocol 204. The validator may require the user 110 to prove they own or control something by providing verifiable title, or that they know a password. The validator, as part of the validation protocol 204, may provide information to the user 110 on one communication channel of the user 110, and require that the user entered the same information on another communication channel by the user 110 to verify legitimacy of the user's 110 identity.

The validation protocol 204 may determine that the information and/or identity of the user 110 is not authentic, and may indicate and/or communicate this failure ("FAIL"). The attestor 120 may indicate this failure to the user 110. On the other hand, the validation protocol 204 may determine that the user 110 and the user information is authentic, and may indicate and/or communicate this authenticity ("PASS").

When the information passes as authentic, the attestor 120 continues to perform the attestation protocol 202 which includes a signing protocol 206. In one embodiment, attestation and signing protocols 202 and 206 provide for the user 110 a digitally-signed attestation transaction, spending an amount of cryptocurrency (e.g. dust) to a digital wallet controlled by a secret sharing cryptographic algorithm using M of N keys. This signed attestation transaction is communicated to the network by the attestor 120, for storage in the centralized or distributed ledger 150. The signed attestation transaction may include the user's public attest key, and is stored at an attestation address. In one embodiment, the user information that was validated and used to generate the attest key is stored by the user. In one embodiment, the user information is stored on the user's device. In one embodiment, the user information is stored in the user's digital wallet. In one embodiment, the user information is stored in an attestor application on a user device. In one embodiment, the user information is captured in a visual or moving code on the user's device. Note that, although transactions are communicated over the Bitcoin network for entry into the blockchain, participants referred to as "miners" may ultimately be the entities that perform transaction verification and entry into the blockchain.

A description of techniques and protocols for creating transactions with use of Bitcoin cryptocurrency may be found in the book by Antonopoulos, Andreas M. *Mastering Bitcoin: Unlocking Digital Cryptocurrencies*, O'Reilly Media, 2014, ISBN 978-1449374044, which is here incorporated by reference in its entirety. The attestation address of the attestation transaction may be computed using a Pay to Script Hash (P2SH) bitcoin protocol. The attestation address of the attestation transaction may be a P2SH multisig address. The attestation transaction's outputs may be spent by a combination comprising attestor or validator's public key, one or more third party cosigner(s) public keys, and a user's public key. Note that the attestation protocol 202 together with the signing protocol 206 is described again later in relation to the flowchart of FIG. 3.

Continuing with reference to the flow diagram 200 of FIG. 2, after attestation by the attestor 120, the user information may be verified by a verifier 160 with use of a verification protocol 210. The verifier 160 may be a merchant, bank, or other entity. The verification protocol 210 may receive and utilize the user's public key, the third-party cosigner(s) public key(s), the user information that was used to create the attestation address, and the attestation transaction signed by the attestor 120. The verification protocol 210 derives the user's public key using the same or similar approach taken earlier above. The verification protocol 210 checks that the attestation address of the attestation transaction is controlled by the user 110, any third-party cosigners, and the attestor 120. The attestation address may map to an M of N digital wallet to implement the multisig signing protocol. The verification protocol 210 verifies that the attestation transaction is still valid and has not been revoked, checking that the attestation transaction is still in the centralized or distributed ledger 150. A successful verification indicates that the authenticated user information is still valid.

Further, the verification protocol 210 may send a challenge cryptographic nonce to the user 110 to be signed using the signing protocol and the user's private key. This cryptographic nonce may be generated by a cryptographic nonce generation algorithm as known in the art. The cryptographic nonce may be generated with, or may include, a timestamp. The cryptographic nonce may be generated through repeated hashing of a random or pseudo-random value. This challenge cryptographic nonce may be generated through software or using a dedicated hardware circuit or chip that supports encryption. The cryptographic nonce challenge may be generated by a mobile application, by a digital wallet, or by an attestation application. In response to receipt of the challenge cryptographic nonce, the user 110 signs the cryptographic nonce using a signing protocol and the user's private key. This confirms that the user 110 still has current control over that particular private/public key pair. Note that the verification protocol 210 is described again later in relation to the flowchart of FIG. 4.

Continuing with reference to the flow diagram 200 of FIG. 2, the user 110 or attestor 120 may revoke an attestation made in the past with use of a revocation protocol 212. The revocation protocol 212 may utilize a third party digital wallet provider or other third party cosigner, or it may be performed solely by the user 110 or attestor 120, or by the user 110 and the attestor 120. The revocation protocol 212 may be performed using a mobile application or a web-based client or cloud service, as examples. A participant may be allowed to revoke an attestation they have made in the past by signing a new transaction, spending the dust corresponding to the original attestation. To spend this dust, the participant may need to provide a subset of the third-party cosigners of the original attestation, namely a user's private attestation key and one or more of the third party cosigner's keys. The attestor 120 may be allowed to revoke an attestation by signing a transaction, spending the dust of an attestation using the attestor's private key. Note that the revocation protocol 212 is described again later in relation to the flowchart of FIGS. 5a and 5b. In the attestation protocol 202, the centralized or distributed ledger may receive a signed attestation transaction to the multisig attestation address, calculated by an attestor or a third-party cosigner. Note that the centralized or distributed ledger may receive this transaction from a third party digital wallet provider different from the attestor or the third-party cosigner. For the convenience of the user, either attestor or the third-party cosigner or both or a third party digital wallet provider or another third party may store user's attest key or public key, protected by a passphrase, on behalf of the user.

In one embodiment, a hierarchical deterministic wallet (HD wallet) is used to generate the public attest key. In some embodiments, the hashed information is used as an offset combined with the public key generated for the information, compliant with the Bitcoin BIP32 standard.

The attestor or third party cosigner may use an existing distributed ledger, such as the Bitcoin blockchain, and in doing so, leverage the existing transaction protocols defined for this distributed ledger as known in the art. The protocols defined herein may be realized using "Colored Coins" on the Bitcoin blockchain, for example.

Figure 3:
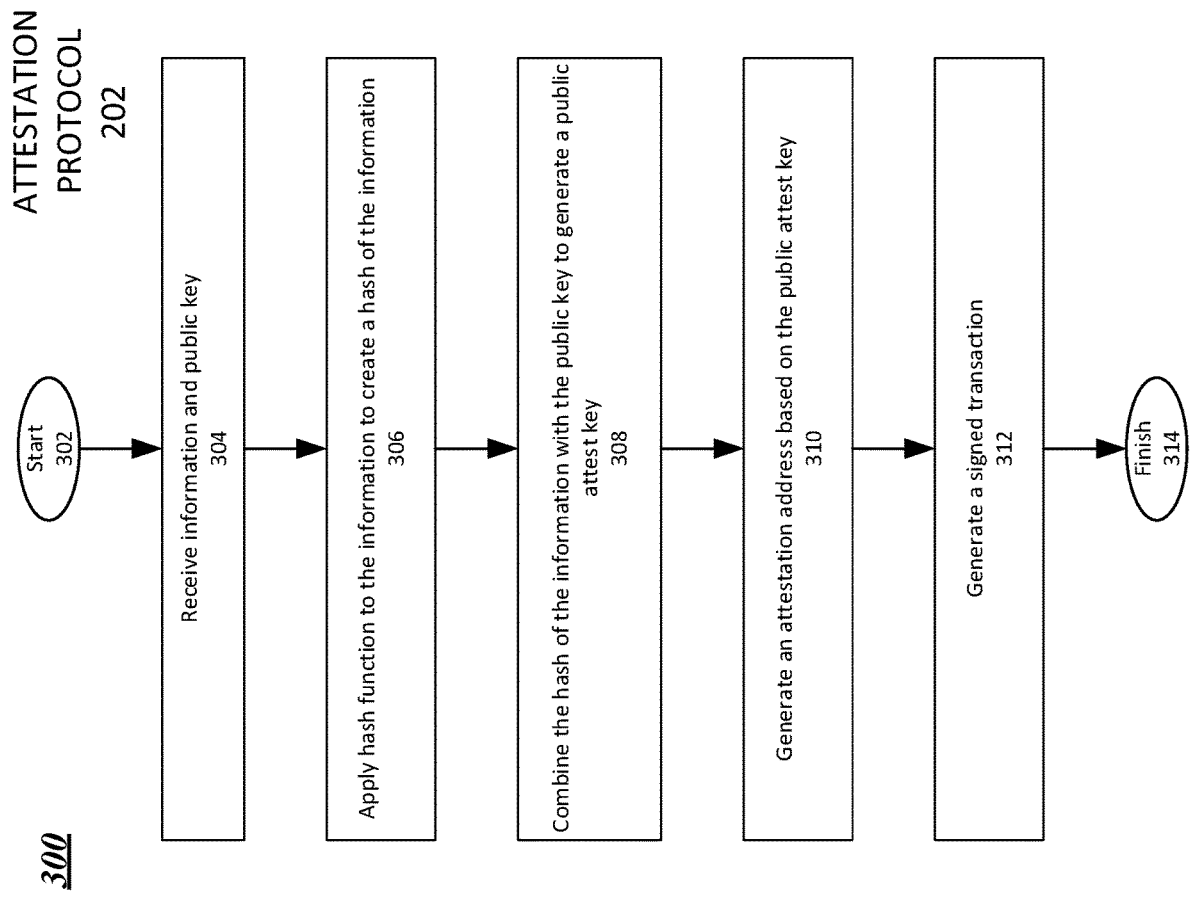
FIG. 3 is a flow diagram of one implementation of a process for attesting to information.

FIG. 3 is a flowchart 300 for describing a method of the attestation protocol 202 which may be performed by an attestor.

Beginning at a start block 302 of FIG. 3, the attestor receives information and a public key which may be generated from the information (step 304 of FIG. 3). The information may be, for example, personal identification information ("PII") belonging to a user. The public key is generated for the information, and may be a user's public key. Upon verification of this information, a first hash function is applied to the information to create a hash (step 306 of FIG. 3). The hash of the information and the public key are combined to generate a public attest key (step 308 of FIG. 3). In some embodiments, elliptic curve addition is used to combine the hash of the information with the public key generated for the information. An attestation address is generated based on the public attest key (step 310 of FIG. 3). A signed transaction which includes the user's public attestation key is generated and communicated for storage in a centralized or distributed ledger at the attestation address (step 312 of FIG. 3). The information that was used to generate the attest key is stored for the user. In one embodiment, the user information is stored on the user's device. In one embodiment, the user information is stored in the user's digital wallet. In one embodiment, the user information is stored in an attestor application on a user device. In one embodiment, the user information is captured in a visual or moving code on the user's device. In some embodiments, the transaction communicated to the centralized or distributed ledger includes a data file in the form of a data block that includes at least the public attest key and the attestation address generated by the techniques described herein. The flowchart ends at an end block 314 of FIG. 3. The signed transaction in the ledger may be checked by a verifier for verification purposes using a verification protocol. The signed transaction in the ledger may be revoked by the user or attestor using a revocation protocol. The key pairs may be created using elliptic curve cryptography. Each participant's public key may be generated by multiplying an elliptic curve generator point G, by the participant's private keys. Each of the participants may know each other's public keys. The information may be hashed with a cryptographic hash function, for example, SHA256, RIPEMD160, or both.

Figure 4:
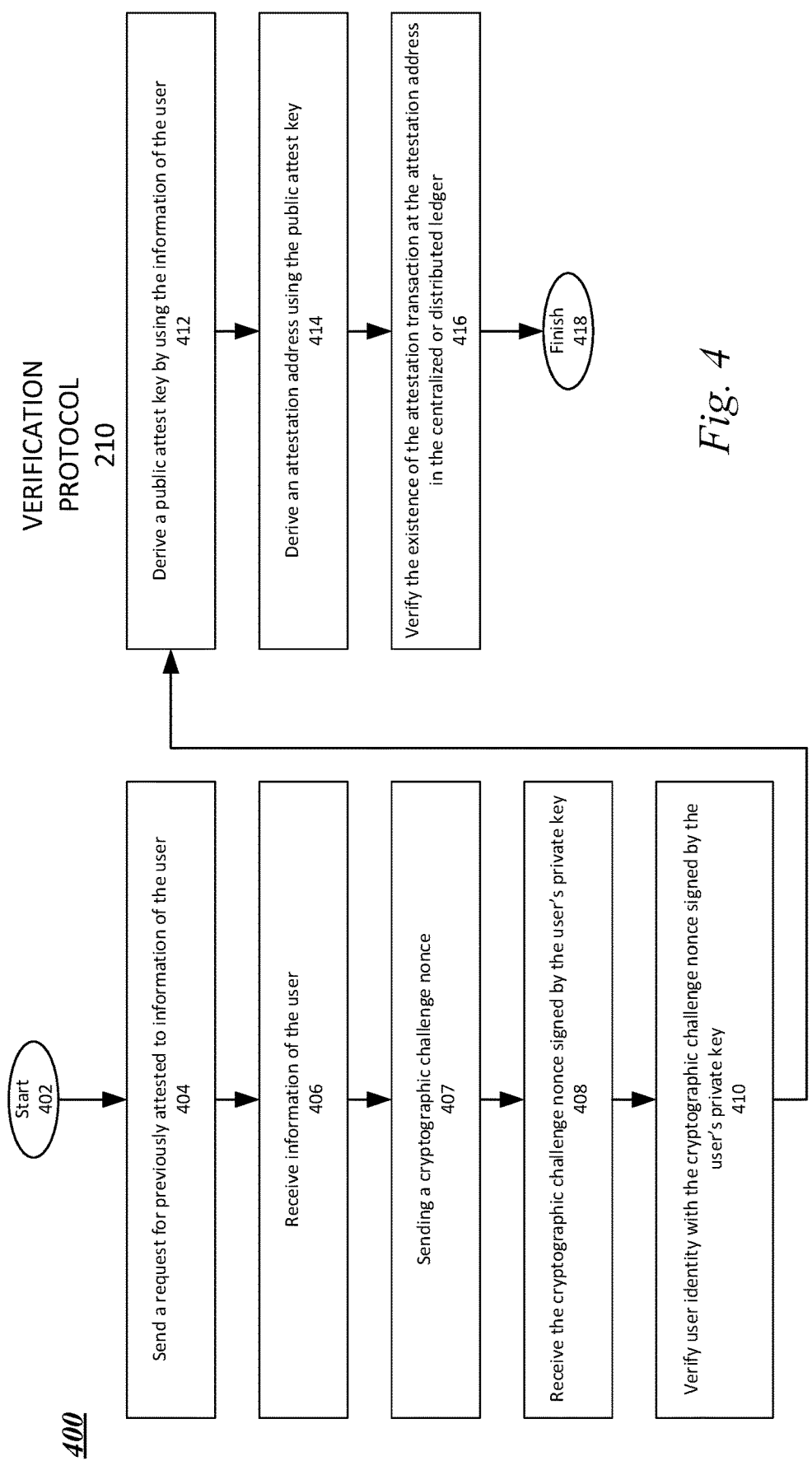
FIG. 4 is a flow diagram for one implementation of a process for the verification of information.

FIG. 4 is a flowchart 400 for describing a method of the verification protocol 210 of the verifier. The protocol starts at block 402 of FIG. 4. At step 404, the verifier sends a request for information of the user to the user. The information requested from the user includes information that has been previously attested to in an attestation transaction stored within a centralized or distributed ledger. The verifier requires as well all the public keys that were used to sign the attestation transaction. At step 406, the verifier receives the information from the user. In step 407, the verifier sends a challenge cryptographic nonce to the user with the request that the user sign this nonce with their private key. In step 408, the verifier receives the signed cryptographic nonce from the user. Except where specified, it is understood that the steps may occur in the sequence described. Alternatively, the steps may occur simultaneously, or in a different order. For example, steps 404 and 407 may occur simultaneously. Similarly, steps 406 and 408 may occur simultaneously or in a different order. In step 410, the verifier uses the user's public key and the signed cryptographic nonce to verify that the user is who they claim to be, i.e., that the user controls the private key that was used to generate the user's public key. In step 412, the verifier then takes the information sent by the user, along with the public key sent by the user, and derives the public attest key. In step 414, the verifier takes the public attest key and all the public keys sent by the user and derives the attestation address. The verifier then uses the attestation address to verify that the attestation transaction exists at that address in the centralized or distributed ledger at step 416. The protocol ends at an end block 418 of FIG. 4. Thus, the information and the validity of the user has been verified.

In step 404 in FIG. 4, the verifier needs specific information from a user. In one embodiment, the verifier may need a user's credit card number, security code, and address, in order to complete a business transaction. In one embodiment, the verifier may need a user's social security number or other federal identification number, in order to process an application. The verifier may need information from a user to perform any function related to the information. The verifier may only wish to perform a function related to this information if the information has previously been attested to by an attestor, and can therefore be assumed to be valid. The verifier may only wish to perform a function related to this information if it can be shown that the user sending the information has control over the information or owns the information. The verifier sends a data request to the user. In one embodiment, this request for data is called a dataRequest. In one embodiment, a cryptographic challenge nonce is sent with the request for data. In one embodiment, the request for information and the cryptographic challenge nonce are sent separately. In one embodiment, the request for data includes a request for the user to send the user's public key. In one embodiment, the request for data includes a request that the user send only the data that was stored when the original attestation transaction was generated. In one embodiment, the request for data includes a request for the user to send all the public keys that were used to create the attestation address, including for example those of the user, an attestor, a third party cosigner, a digital wallet provider, etc.

In step 406 of the verification protocol 210, the verifier receives the information requested from the user. In one embodiment, the verifier receives the user's public key in addition to the information requested. In one embodiment, the verifier also receives the public keys that were used to create the attestation address. In one embodiment, the information sent is the information that was stored during the original attestation protocol. In one embodiment, the public keys received from the user include the attestor's public key and one or more third party cosigner's public keys. In one embodiment, the received data includes the cryptographic challenge nonce which has been signed by the user's private key. In one embodiment, the cryptographic challenge nonce is sent to the user in step 407 and the cryptographic challenge nonce signed with the user's private key is received back in step 408. In step 410, the verifier may use the signed cryptographic nonce and the user's public key to verify that the user is who they say they are, as in known in the art. In step 412, the verifier uses the information received from the user and the user's public key to derive the public attest key. In one embodiment, the verifier may create the public attest key themselves using an application or website of the attestor which uses a portion of the attestation protocol to generate the public attest key. In one embodiment, the verifier may create the public attest key using an application or web site provided by a third party, for example but not limited to a digital wallet provider. In one embodiment, the verifier may create the public attest key using an application which uses a portion of the attestation protocol to generate the public attest key. In one embodiment, the verifier may send the information received by the user to the attestor and may receive the public attest key back from the attestor. In one embodiment, the verifier may have a prior knowledge of the attestation protocol and may generate the public attest key locally. In step 414, the verifier then derives the attestation address, using the public attest key and the other keys sent by the user. In one embodiment, the verifier may create the attestation address themselves. In one embodiment, the verifier may create the attestation transaction using an application or website of the attestor. In one embodiment, the verifier sends the user information, the user's public key, and all the other keys sent by the user to a third-party application or web site and the third-party application or website performs the function of calculating the public attest key and the attestation address on behalf of the verifier. In one embodiment, the verifier uses a third-party digital wallet provider application or website to verify the existence of the attestation transaction at the attestation address. In one embodiment, the verifier may send the public attest key and the other public keys received by the user to the third-party application or website via an API. In one embodiment, the verifier may verify that the attestation address for the attestation transaction can be derived using the Pay to Script Hash (P2SH) with the public attest key and the other public keys sent by the user which may include the attestor's public key and a third party cosigner public key. In step 416, the verifier may check that the attestation address of the attestation transaction is valid, by verifying the existence of the attestation transaction at the attestation address in the centralized or distributed ledger and determining whether transaction was revoked, by verifying that the cryptocurrency associated with the attestation transaction has not been spent. In one embodiment, the verifier may use a third-party digital wallet provider application or website to verify the existence of the attestation transaction at the attestation address. In one embodiment, the verifier may send the data received from the user to an attestor in order to verify the existence of the attestation transaction at the attestation address. In one embodiment, the above steps of verifying control of the user's private key using the challenge nonce; deriving the public attest key; generating the attestation address; and verifying the attestation transaction at the attestation address in the centralized or distributed ledger may be done by in various combinations by the verifier, by the attestor, or by a third party.

Figure 5A:
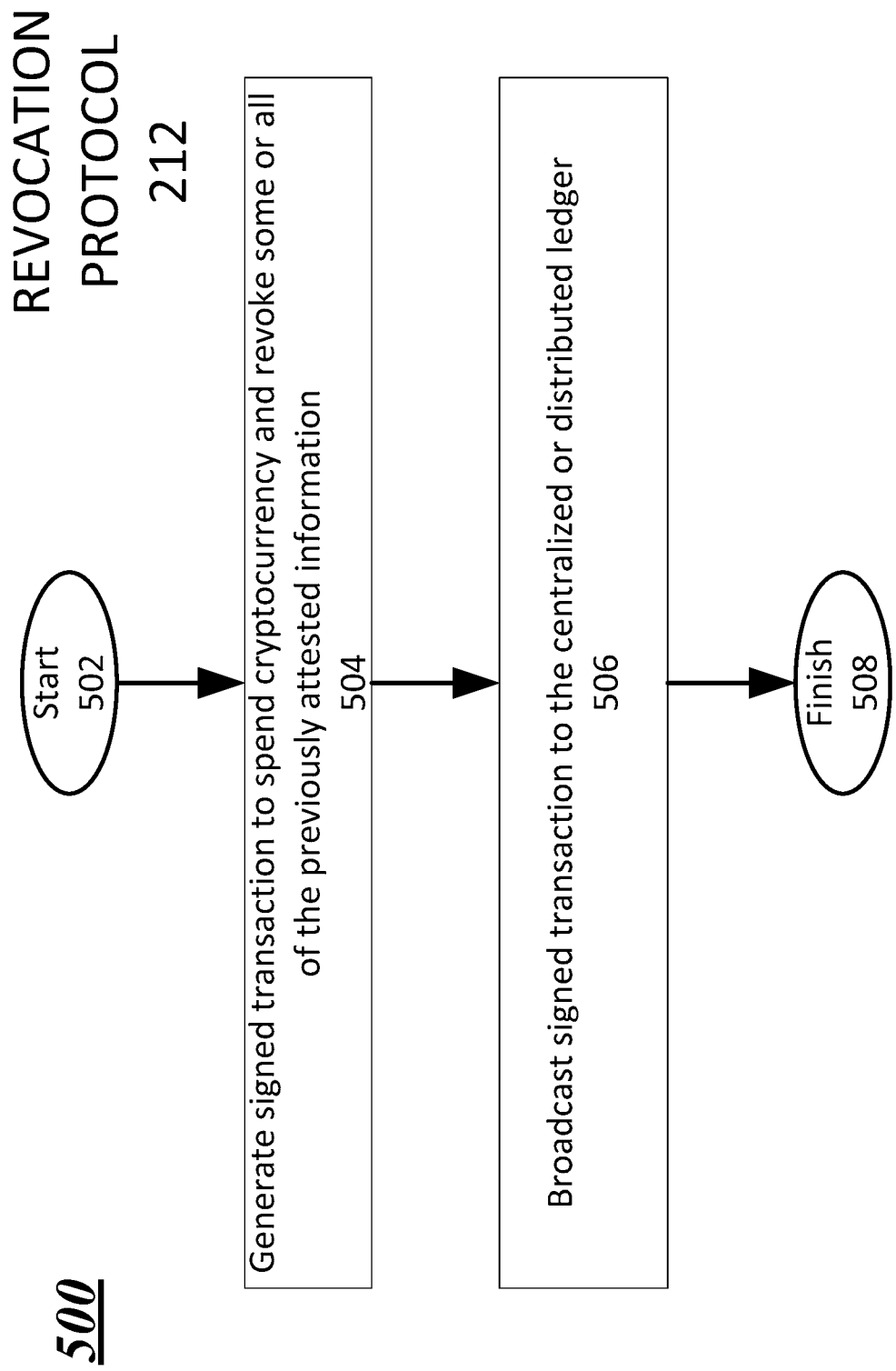
FIG. 5a is a flow diagram for one implementation of a process to revoke some or all of previously attested information.

FIG. 5a is a flowchart 500 for describing a method of the revocation protocol 212. Prior to describing the steps of the revocation protocol 212 of FIG. 5a, it is noted that an attestation transaction authenticating information has already been generated and stored in the centralized or distributed ledger. In one embodiment, the revocation protocol is used to remove information that has previously been attested to. If a user had attested to a deed for some property that they owned, and later sold the property, then the user may wish to revoke the attestation transaction. In one embodiment, the attestor wants to revoke the attested information. For example, if a driver's license needed to be revoked for some sort of offense, then the department of motor vehicles, who may be the original attestor to this information, would revoke the driver's license. In another example, the attestor may be different from the issuer of the information that needs to be revoked, but may still be the party that revokes the transaction. For example, the attestor may discover that somehow a user had created an account at the attestor using fraudulent identification, and then the attestor would revoke the attestation that the user had created. In one embodiment, the user may wish to revoke their own attested information, for example, if they thought it had been compromised. In one embodiment, the revocation protocol is used to change information that has been previously attested to. If a user had previously attested to personal information including an address and a credit card number, and then the credit card number changed, the user could use the revocation protocol to change the credit card information in the attested information. In one embodiment, the original attestation transaction was generated by using an m-of-n multisig transaction, and so much be revoked using the same m-of-n signatures. Beginning at a start block 502 of FIG. 5a, a new signed transaction is generated to revoke the previous attested information (step 504 of FIG. 5a). In one embodiment, there is an attestation transaction associated with the previously attested information. The new, signed transaction is then sent over the network to the centralized or distributed ledger (step 506 of FIG. 5a) which revokes the attestation transaction by spending cryptocurrency associated with the attestation transaction. The flowchart 500 of FIG. 5a ends at a finish block 508.

Thus, in the revocation protocol 212, an attestation transaction authenticating user information may be revoked by spending the cryptocurrency and thus invalidating the transaction that was created to represent the earlier attestation. In one embodiment, the destination of the cryptocurrency associated with the spending transaction would be the person or entity initiating the revocation. In one embodiment, it is the attestor that is initiating the revocation and the cryptocurrency is sent back to the attestor's digital wallet. In one embodiment, M of N keys in the attestation address are needed to sign the spending transaction in order to revoke the attestation, in other words the M of N keys used to sign the original attestation transaction are needed in order to sign the spending transaction in order to revoke the attestation. The revoking transaction may be entered into the centralized or distributed ledger by the attestor, by the user, by the third party cosigner, or by a fourth party who is not part of the m-of-n group.

Figure 5B:
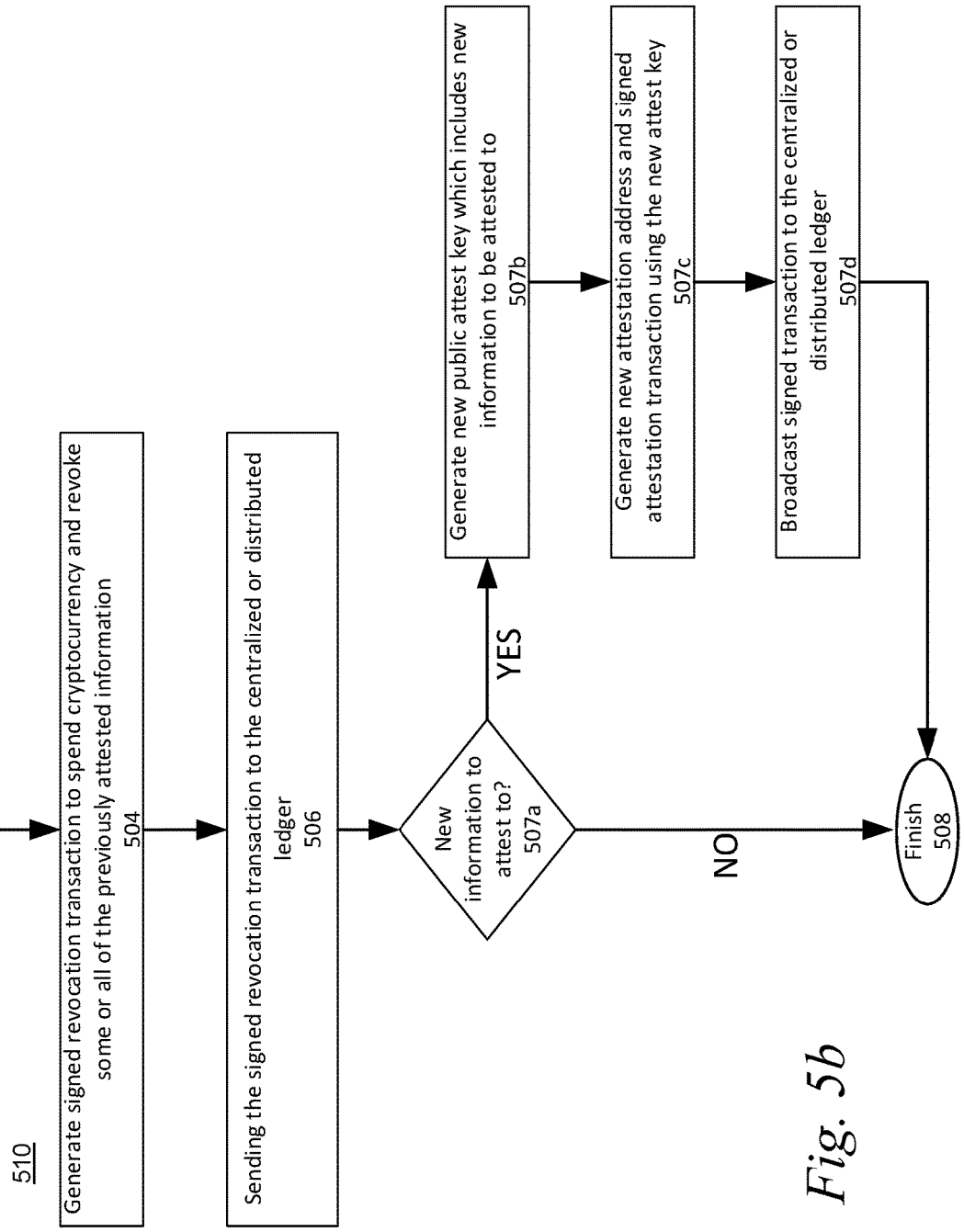
FIG. 5b is a flow diagram for a further embodiment of a process to revoke some or all of previously attested information.

FIG. 5b is a flowchart 510 which describes an exemplary embodiment of the revocation protocol in more detail. The protocol begins at start block 502. Previously attested-to information, that is captured in an attestation transaction at an attestation address, that needs to be removed or changed, is identified. In one embodiment, this information could be identified by the user, for example because some personal information like an address, driver's license number, or credit card number has changed. In one embodiment, the revocation could be initiated by a user because of a fear of a data breach. In one embodiment, this information could be identified by an attestor that had previously attested to information from this user, and who has identified that some of the previously attested to information is no longer valid. In one embodiment, an attestor could identify information that needs to be revoked because a user no longer is in existence. In one embodiment, a third party may request that previously attested to information is revoked, for example in the instance of a relationship that was established between the user and the third party which has become invalid. At step 504, a new attestation transaction is generated to spend the cryptocurrency (the dust) that is associated with the existing transaction, in order to revoke some or all of the previously attested to information that has been identified for revocation as discussed above. In one embodiment, a user generates a signed transaction which spends the cryptocurrency or dust associated with the existing attestation. In one embodiment, an attestor generates a signed transaction which spends the cryptocurrency or dust associated with a transaction. In one embodiment, a user may identify the information that needs to be revoked, and an attestor or other third party may perform all the steps of the actual revocation protocol on behalf of the user. In one embodiment, the information that is to be revoked is a subset of the information in the existing unspent attestation transaction. In one embodiment, all of the information in the existing attestation transaction is desired to be revoked. At step 506, the new signed transaction is sent to the centralized or distributed ledger, thereby spending the cryptocurrency associated with the previous attestation transaction. At step 507a, it is determined whether there is new information that needs to be attested to. In one embodiment, the new information may replace the information which has just been revoked. In one embodiment, the new information may be a correction to the information which has just been revoked. In one embodiment, the attestation transaction that was spent when the signed revocation transaction was sent to the centralized or distributed ledger contained some information that the user wants to revoke and some information that the user wants to keep, and so the new information may contain some of the old information which was revoked. In one embodiment, the new information may be associated with a different user than the information which was just revoked. If there is no new information to attest to, the protocol moves to block 508 and finishes. If there is new information to attest to, then the attestation protocol is invoked. The primary steps of this protocol are shown in steps 507b, 507c, and 507d. In step 507b, a new public attest key is created, using a hash of the new information to attest to combined with the user's public key. In step 507c, a new attestation address is created based on the public keys of all the signatories to the attestation and the attestation transaction is signed. To edit the details of an attestation transaction, the existing transaction can be revoked and then an entirely new transaction can be created using the attestation protocol. In step 507d, the signed attestation transaction is broadcast to the centralized or distributed ledger. The protocol then moves to block 508 and finishes.

Figure 6:
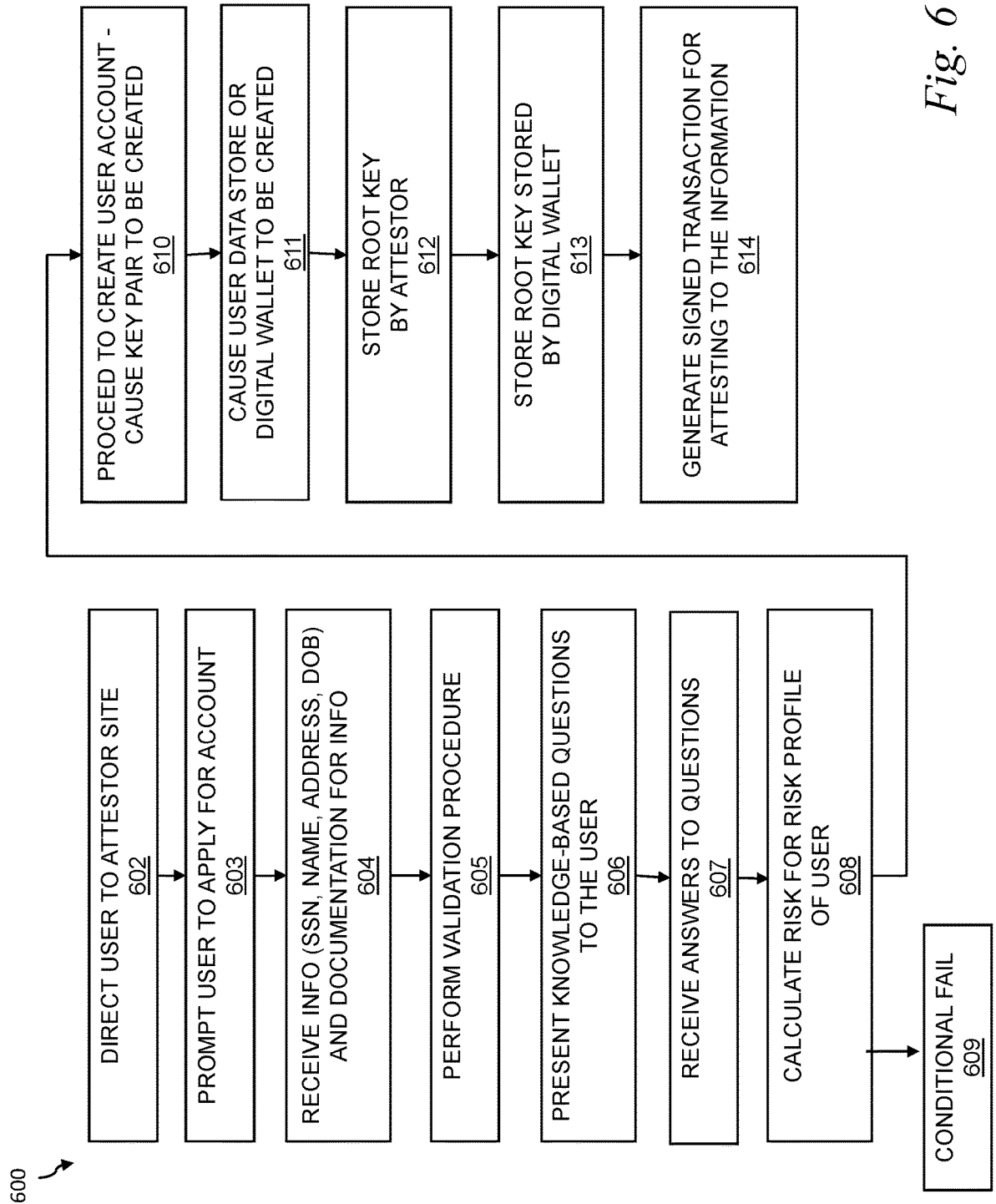
FIG. 6 is a flow diagram for one implementation of a method for creating a user account for attestation.

FIG. 6 is a flowchart 600 for describing a method for creating a user account for a user with an attestor for attestation purposes. A user is directed to an attestor's website or app (step 602 of FIG. 6). The attestor site prompts the user to apply for new account and to provide information (e.g. PII) (step 603 of FIG. 6). The attestor site receives from the user an indication to create the new account and receives from the user the information (e.g. PII) to be attested, as well as any supporting documents and/or other evidence that helps verify the information (step 604 of FIG. 6). The received information may include full name, home address, Social Security Number (SSN), and date of birth (DOB), along with documentation including a SSN card, a birth certificate, and a driver's license.

A validator, which may be a third party, the attestor, or both, may validate the information using a validation protocol (step 605 of FIG. 6). Here, for example, the validator may produce knowledge-based questions for the attestor to present to the user (step 606 of FIG. 6). In response, the user may submit answers which are received by the attestor (step 607 of FIG. 6). The attestor and/or the validator may calculate a degree of risk for the user based in part on how correctly the user answered the knowledge-based questions (step 608 of FIG. 6). Conditionally, if the user's risk profile is too high, the attestor may refuse to create or validate the user account (step 609 of FIG. 6).

On the other hand, when the information is determined to be valid, the attestor proceeds to create the user account and perform steps for attestation. This causes a cryptographic asymmetric key pair (public key and private key) to be created for the user (step 610 of FIG. 6). This key pair may be created by the attestor, the digital wallet provider, or other device. With a private key, the user is able to perform a signing protocol to sign attestation transactions. At various times and for various protocols, it is necessary to establish that the user is in control of the attestation transaction, in other words that the attestation transaction has not been revoked and is still a valid transaction. In one embodiment, this is done by checking to make sure the transaction has not been spent. In one embodiment, the transaction could be verified as unspent by looking to see if the transaction can be found in the unspent transaction output (UTXO) cache.

The attestor may also create or cause to be created a digital wallet for the user (step 611 of FIG. 6). Both an attestor and a third-party cosigner may sign the root key of the user, and may place the key in the previously-created digital wallet. Either the attestor or the third-party cosigner may store the root key (steps 612 and 613 of FIG. 6). The attestor performs or causes to be performed an attestation protocol, a validation protocol, and a signing protocol, for creating a signed transaction which is communicated over the network (e.g. the Bitcoin network) for storage in the centralized or distributed ledger (step 614 of FIG. 6).

Figure 7:
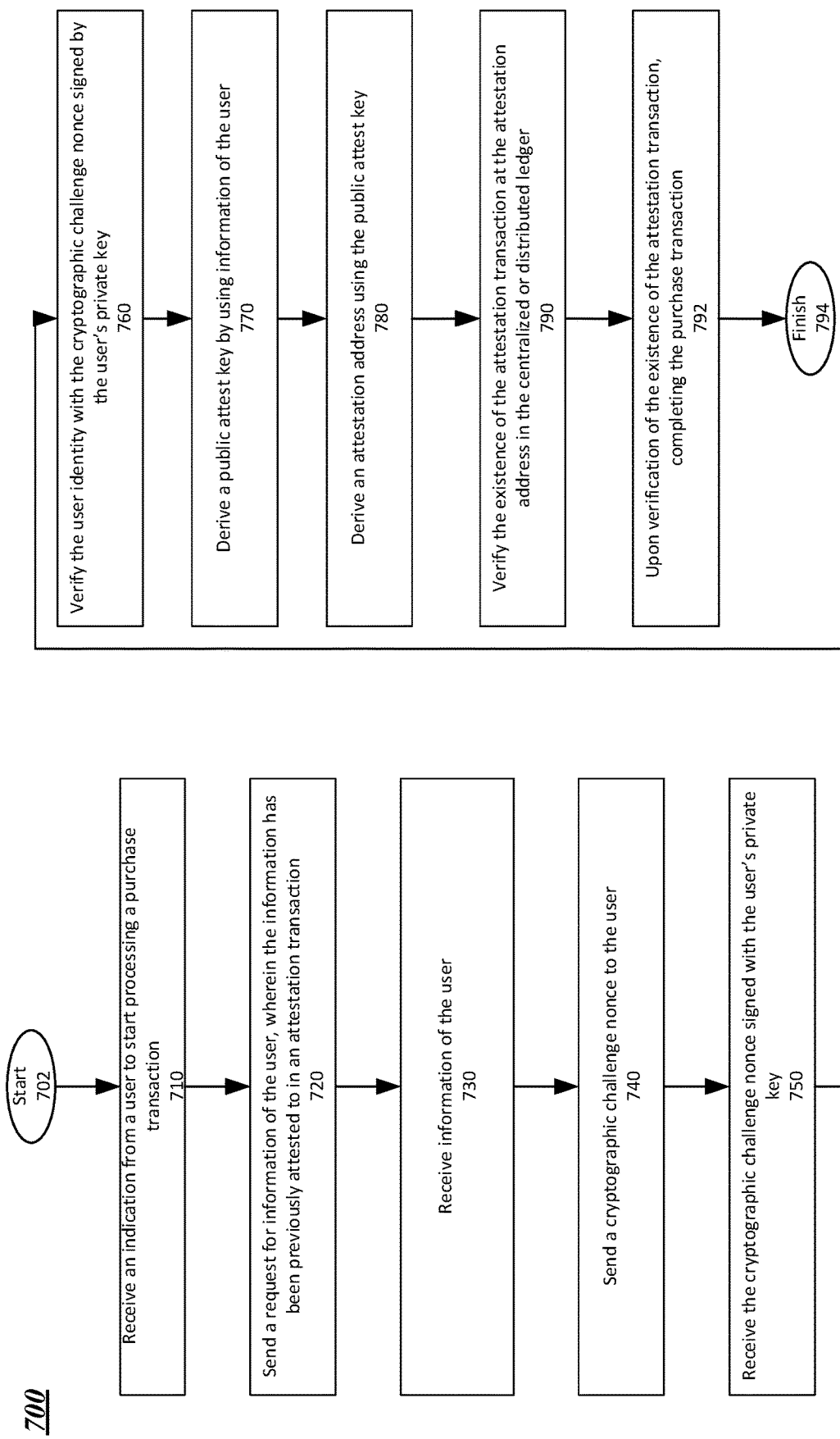
FIG. 7 is a flow diagram for one implementation of a process for using the verification protocol for purchasing goods online.

FIG. 7 is a flowchart 700 for describing a method of executing a business transaction from a commercial website. In the exemplary embodiment, the business transaction is a purchase transaction, and the commercial website is a merchant website. Alternatively, the commercial website is for a financial services institution, etc. Beginning at a start block 702 of FIG. 7, the merchant's website, or a merchant application running on the mobile device of the user, may receive an indication from a user to start processing a purchase transaction (step 710 of FIG. 7). In step 720, a request for information of the user is sent, wherein the information has been previously attested to in an attestation transaction stored within a centralized or distributed ledger at an attestation address, the centralized or distributed ledger providing a verifiable record of transactions. In step 730, a processor associated with the merchant website receives the information of the user. In step 740, a cryptographic challenge nonce is sent to the user. In step 750, the cryptographic challenge nonce is signed with the user's private key and sent back to the merchant's website or the merchant application running on the mobile device of the user. In step 760, the user's identity is verified using the cryptographic challenge nonce signed by the user's private key. In step 770, the public attest derived using information of the user. In step 780, the attestation address is derived using the public attest key. In step 790, the existence of the attestation transaction at the attestation address in the centralized or distributed ledge is verified. In step 792, upon verification of the existence of the attestation address, the purchase transaction is completed. The method ends at step 794.

In one embodiment, the merchant application may facilitate the indicating of the user to start processing the transaction through an electronic display. In one embodiment, the electronic display or presentation has a login or entry screen corresponding to the merchant's website and receiving an indication from a user to start processing a transaction comprises receiving login information from the user and validating the login information. In one embodiment, in the presentation, the user may click on a button, menu item, or other indicator, to login, enter, or start processing associated with the online site. In one embodiment, the merchant receives the user login or an indication from the user to start processing without logging in, for instance if the user enters the merchant's site as a guest. In step 720, the merchant sends a request for information of the user. In one embodiment, the merchant's website may require user information in order to complete the purchase transaction. For example, the merchant's website may require credit card or payment information or shipping information of the user. In one embodiment, the merchant prompts the user to share necessary information with the merchant's website. In one embodiment, the merchant informs the user that the information requested needs to have already been attested to by the attestor. In one embodiment, the information requested may include, for example, user payment information or user shipment information. In one embodiment, the information requested from the user may include the user's public key, and the public keys of the attestor and any third-party cosigners of the attested information. In one embodiment, the merchant may request the public keys of the user, the attestor, and any one or more third-party cosigners from a digital wallet. In one embodiment, sending a request for information of the user comprise providing a request to an attestor for information of the user. In step 730 of FIG. 7, the merchant website receives the user information necessary in order to complete the purchase. In one embodiment, receiving information comprises receiving from the attestor the information of the user.

The merchant website may then verify the information using the verification protocol described earlier above. In step 740, the merchant website may send a cryptographic challenge nonce to the user, requesting that the user signs the nonce with their private key. The merchant performs this step, in order to confirm that the user has control of the user's private key. In one embodiment, the cryptographic challenge nonce is sent to an attestor application, wherein the attestor manages the user's private keys and can sign the cryptographic nonce with the user's private key. In one embodiment, the cryptographic challenge nonce is sent to a third-party digital wallet provider, wherein the digital wallet provider controls the user's private keys and can sign the cryptographic nonce with the user's private key. In step 750, the merchant web site receives the cryptographic challenge nonce signed with the user's private key. In step 760, the merchant website verifies the user identity with the cryptographic challenge nonce signed by the user's private key. In one embodiment, this step is performed by using the user's public key as in known in the art. In one embodiment, this step is performed by the attestor on behalf of the merchant. In one embodiment, this step is performed by an attestor application that the merchant or the user is interacting with. In one embodiment, the attestor provides an API in order for the merchant to perform this step. In one embodiment, this step is performed by a digital wallet provider on behalf of the merchant. If this verification is successful, then the merchant now has a high degree of confidence that the user is who they say they are, because they control the user's private key. In step 770, the merchant derives a public attest key using the information received from the user and the user's private key, as described in the methods herein. In step 780, the merchant further derives an attestation address using the public attest key, and the other public keys received, as described in the methods herein. The merchant verifies the existence of the attestation transaction at the attestation address in the centralized or distributed ledger in step 790. In one embodiment, the merchant additionally verifies that the transaction is in the unspent transaction output (UTXO) cache and therefore is still valid and has not been revoked. In one embodiment, one or more of steps 770, 780, and 790 may be performed by an attestor. In one embodiment, one or more of steps 770, 780, and 790 may be performed by a digital wallet provider on behalf of an attestor or a merchant. The merchant may now have a high degree of confidence that the information provided by the user is valid. The merchant may proceed to complete the purchase transaction in step 792, without necessarily having to re-verify the information through additional fraud detection and prevention steps. The method ends at step 794 of FIG. 7.

Figure 8:
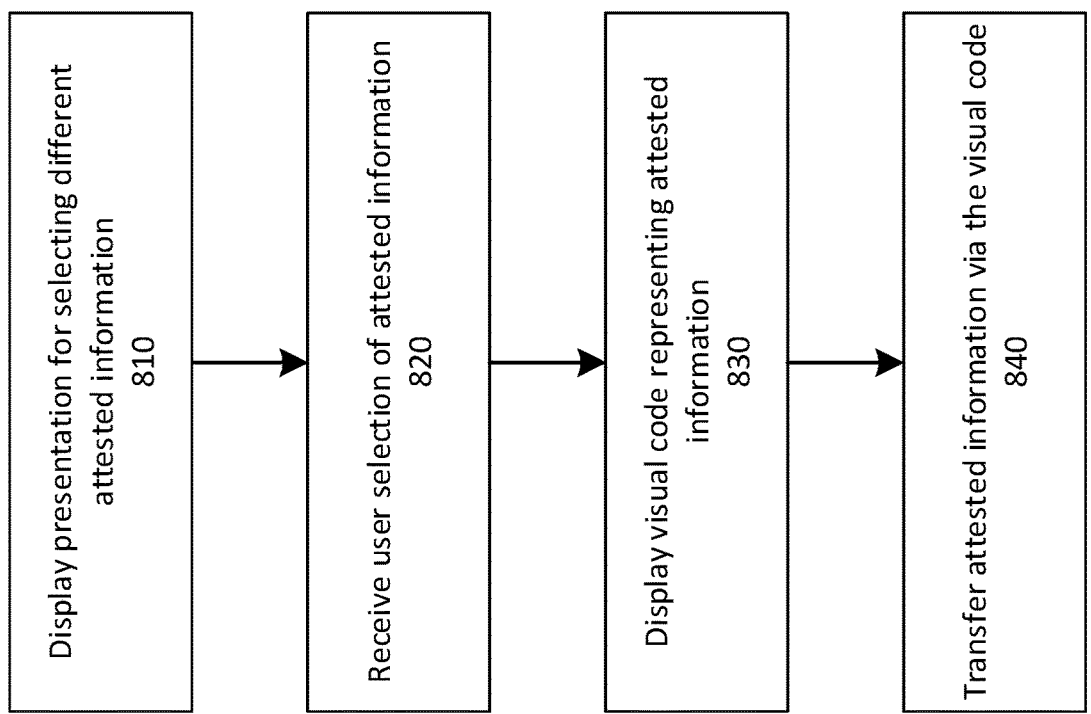
FIG. 8 is a flow diagram for one implementation of using a visual code to represent attested information.

FIG. 8 is flowchart 800 for describing a method of executing a purchase transaction with a merchant. In one embodiment, this method provides for verifying identity offline (e.g., without an active Internet data connection) using an attestation application running on a user's device. In one embodiment, the method using a third-party digital wallet application. In one embodiment, the method uses an API provided by an attestor. In one embodiment, the method uses a merchant website or application.

The user has previously had information attested to by an attestor. In step 810, the user opens the application on the user's device and is displayed a presentation for selecting different items of attested information. In one embodiment, the user may select what attested information to share of a totality of attested information. In one embodiment, the user may select a pre-configured template of information. In step 820, the application on the user's device receives the user's selection of attested information. In one embodiment, the user's selection of attested information includes a set of payment information. In one embodiment, the user's selection of attested information includes the proper license or permit for an activity, a ticket for an event, or a passport for a border stop.

Upon selection of information, in step 830 the application presents a visual code representing the selected attested information on the user's device. In one embodiment, the visual code is a barcode or a moving visual image. The visual code represents the selected attested information. In one embodiment, the user may show this presentation to the verifier, who may be a merchant, a border agent, a metro turnstile, or other person. In one embodiment, the verifier may scan the visual code, with use of a scanner or a camera on a mobile device, as examples.

In step 840, the application transfers the selected attested information via the visual code. In one embodiment, the user's device running the application may transfer the information using one of many other techniques of peer-to-peer (P2P) communication including, but not limited to, local Wi-Fi, Bluetooth, Bluetooth LE, near field communications (NFC), infrared, RFI, ambient audio, supersonic audio, or the like. Upon receipt of the attested information, the device of the verifier performs a verification protocol to assert whether the data was attested to in the past by an attestor, indicating if the information is verified. The verifier can consult its own cached copy or subset of the centralized or distributed ledger database that may contain the user's attestation transactions. The attestation is still valid if the attestation transaction is in the ledger, indicating that up to the age of the local cache, the attestation had not been revoked by any capable parties. The device of the verifier as part of the verification protocol, may send a challenge to the user in the form of a cryptographic nonce message using the procedure described herein above. In one embodiment, the verifier is the merchant. In one embodiment, the verifier is an attestor who acts on behalf of the merchant. In one embodiment, the verifier is a third-party digital wallet provider who acts on behalf of the merchant.

Figure 9:
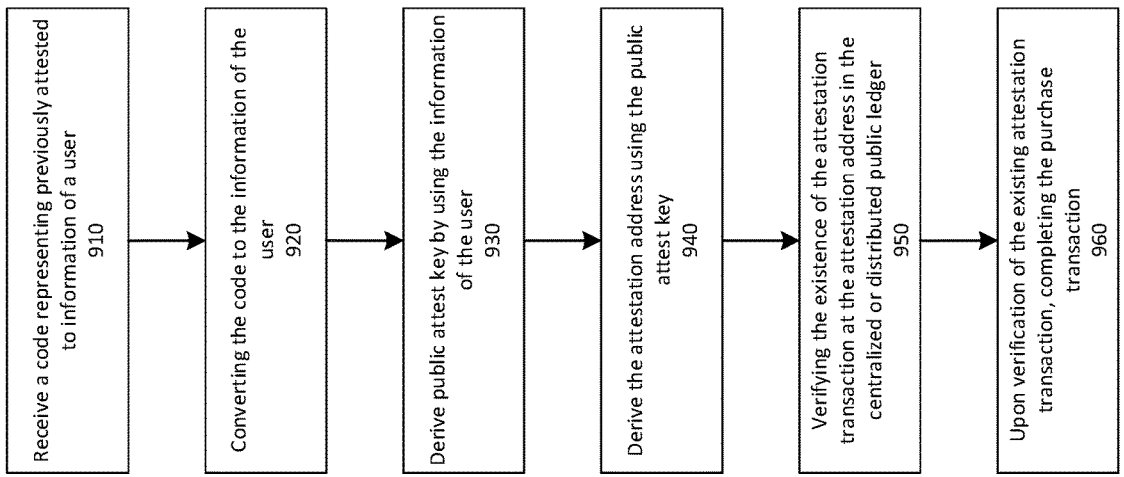
FIG. 9 is a flow diagram for one implementation of a using a visual code to process a business transaction at a commercial entity, such as a merchant.

FIG. 9 is a flowchart 900 for describing a method of executing a purchase transaction with a merchant. In one embodiment, this method provides for verifying identity offline (e.g. without an active Internet data connection) using an attestation application running on a user's device. The user has previously had information attested to by an attestor, and this information is stored. A communication channel is set up between the user's device and the merchants' server in order for all data to be passed across. In one embodiment, the channel may be established by the user presenting on their device a code that the merchant can scan. In one embodiment, the communication channel is established by way of receiving a signal transmitted by a short-range transmitter for a processor associated with a user, using one of many techniques of peer-to-peer (P2P) communication including, but not limited to, local Wi-Fi, Bluetooth, Bluetooth LE, near field communications (NFC), infrared, RFID, ambient audio, supersonic audio, or the like. In one embodiment, peer-to-peer communications would only be used if a connection to the internet was not available. In one embodiment, the user opens an attestation application on a mobile device and is displayed a presentation for selecting different stored previously attested information. In one embodiment, the attestation application on the user device creates a code which is used both to establish the communication link and to transfer the previously attested information and the user's public key. In one embodiment, the user may select what attested information to share, or select a pre-configured template of information. In step 910, the merchant receives a code which represents its save information of the user, wherein the code is provided by an output device for a processor associated with the user, and wherein the information has been previously attested to in an attestation transaction stored within a centralized or distributed ledger at an attestation address. In one embodiment, the merchant receives the code via an attestor application on a merchant device. In one embodiment, the merchant receives the code via a third-party digital wallet application on the merchant device. In one embodiment, receiving at a processor associated with the merchant a code representing information of the user comprises receiving a visual code displayed on a display unit for a processor associated with the user. In one embodiment, receiving at a processor associated with the merchant a code representing information of the user comprises optically recognizing the visual code displayed on a display unit for the processor associated with the user. In one embodiment, receiving at a processor associated with the merchant a visual code representing information of the user comprises placing an optical recognition device associated with the processor of the merchant in visual proximity with the display unit for the processor associated with the user. In one embodiment, the merchant may act as a verifier and may user the verification protocol as previously described. In one embodiment, the merchant may be a border agent, a gate or turnstile at an entry port to public transit, or another person. In one embodiment, the user selection of attested information includes a set of payment information, the proper license or permit for an activity, a ticket for an event, or a passport for a border stop.

In step 920, the processor associated with the merchant converts the received code to information of the user. In one embodiment, the merchant scans the visual code, with use of a scanner or a camera on a mobile device, as examples. In one embodiment, an attestor application converts the code into information of the user. In step 930, the public attest key is derived by using the information of the user. In one embodiment, the public attest key is derived using an attestor application. In one embodiment, the public attest key is derived using a digital wallet application. In one embodiment, the user information converted from the code includes a user's public key. In one embodiment, the user's public key is stored by the attestor application or by the third-party digital wallet application. In step 940, the attestation address is derived using the public attest key. In step 950, the attestation address is used to verify the existence of the attestation transaction in the centralized or distributed ledger, as has previously been shown. In step 960, upon verification of the existence of the attestation transaction, the merchant completes the purchase transaction. In one embodiment, prior to completing the purchase transaction, the merchant sends a cryptographic challenge nonce to the processor associated with the user in order to verify that the user controls the user's private key.

Figure 10:
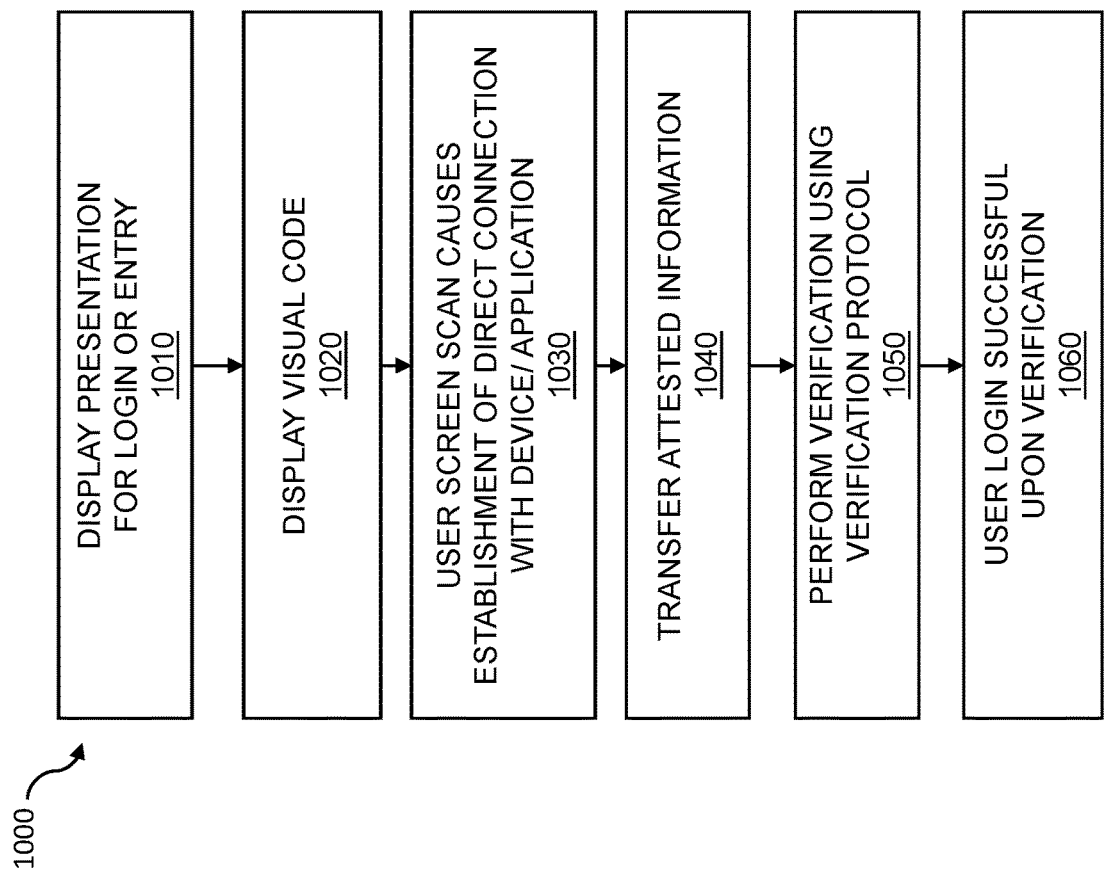
FIG. 10 is a flow diagram for one implementation of a process for using a verification protocol for logging into a website.

FIG. 10 is a flowchart 1000 for describing a method for use in logging into a web site or online site or service using an attestation application on a mobile phone or device (e.g. a smartphone). At first, the user is presented with a login or entry screen of the online site. The user may click on a button, menu item, or other indicator, to login, enter, or start processing associated with the online site (step 1010 of FIG. 10). The online site provides a presentation of a visual code (e.g. a barcode or a motion QR) to the user (step 1020 of FIG. 10). The user proceeds to scan the visual code using the attestation application (e.g. with use of the camera on the mobile device) (step 1030 of FIG. 10). The act of scanning the visual code causes a direct connection to be established between the mobile device and the online site.

The online site provides a presentation and procedure to allow the user to communicate information that has already been attested to by the attestor. The user passes this identifying information attested to in its attestation application to login (step 1040 of FIG. 10). This identifying information may include, for example, an email address and/or any other information item. The online site then proceeds to verify the user's identifying information using the protocols discussed earlier above (step 1050 of FIG. 10). If the user's identifying information is verified, the user is successfully logged into the online site based on the authenticated information provided by the attestation application (step 1060 of FIG. 10), Normal session management techniques on the online site are thereafter performed.

Figure 11:
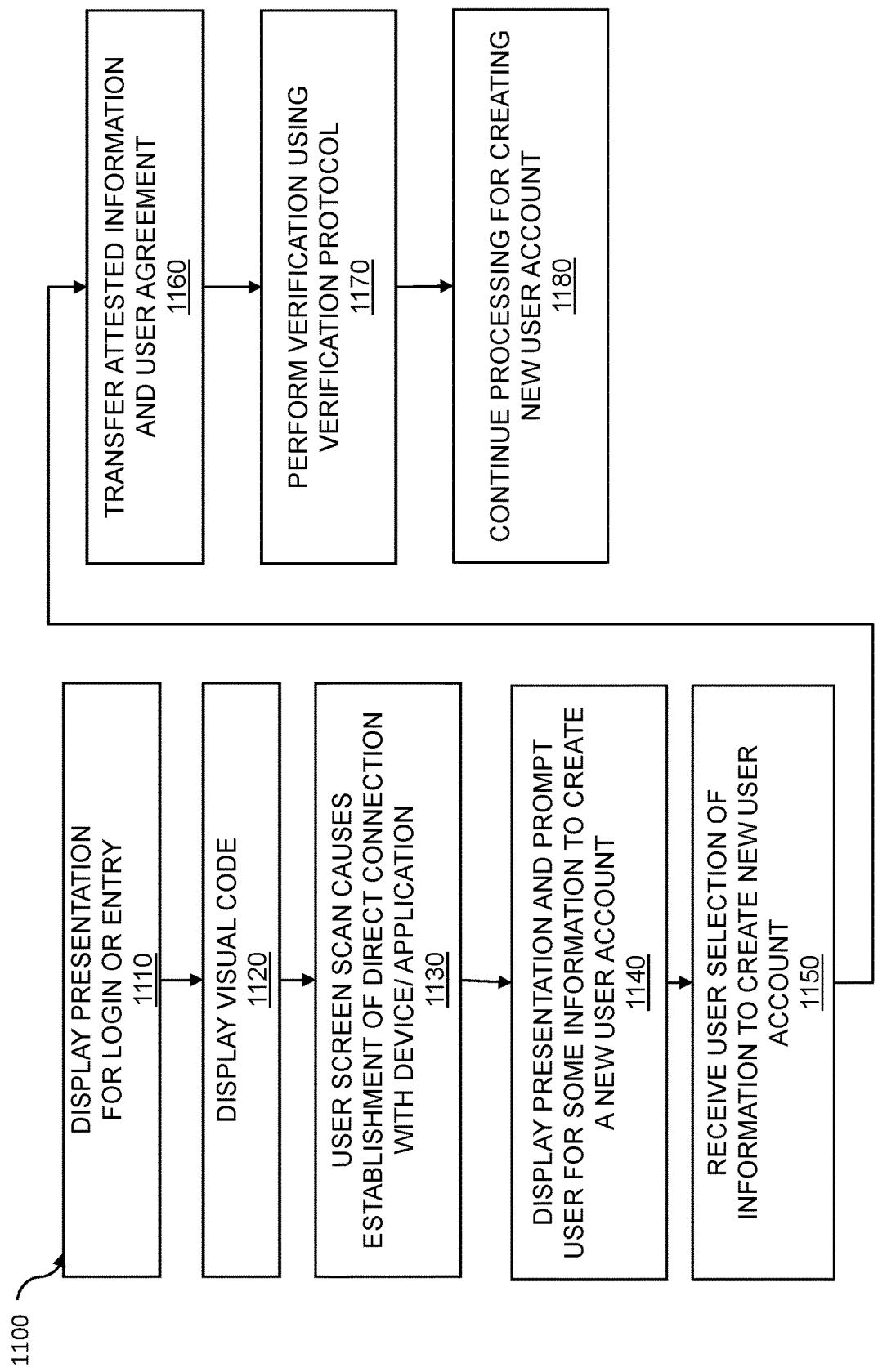
FIG. 11 is a flow diagram for one implementation of a verification protocol utilized for creation of a new user account at a website.

FIG. 11 is a flowchart 1100 for describing a method for signing up or enrolling to create a user account on an online site or service using an attestation application on a mobile phone or device (e.g. a smartphone). At first, the user is presented with a login or entry screen for the online site. The user may click on a button (e.g. login button), menu item, or the like, to login or enter the online site (step 1110 of FIG. 11). The online site provides a presentation of a visual code (e.g. a barcode or a motion QR) to the user (step 1120 of FIG. 11). The user proceeds to scan the visual code using the attestation application (e.g. with use of the camera on the mobile device) (step 1130 of FIG. 11). The act of scanning the visual code causes a direct connection to be established between the mobile device and the online site.

Next, the user is provided with a presentation which asks the user to share certain information in order to create an account (step 1140 of FIG. 11). Some of the information requested may be required in order for the user to open an account, and some of the information requested may be optional. The user may select which optional information they want to provide as part of the account creation (step 1150 of FIG. 11). The user may the send the required information and the selected optional information to the online site using the attestation application. Here, the user's attested information along with the user's agreement may be sent to the online site from the attestation application of the user's mobile device (step 1160 of FIG. 11). The online site may trust the attested information provided through the attestation application. On the other hand, the online site may decide to perform an additional verification using the verification protocol, previously described earlier above. Once the online site is confident in the authenticity of the user's information, the online site follows their normal process of creating a new user account based on the attested (and potentially verified) information (step 1180 of FIG. 11).

Figure 12:
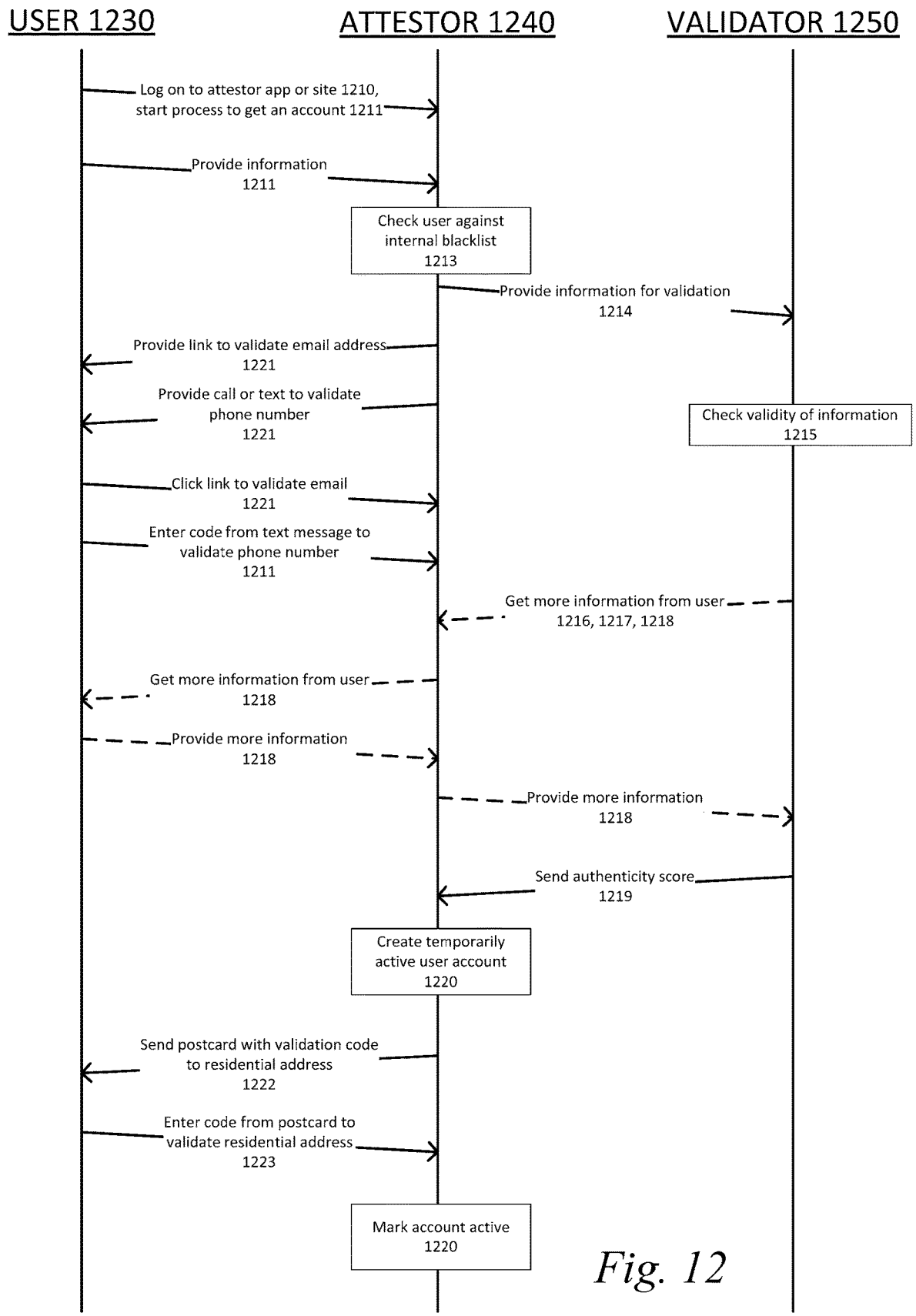
FIG. 12 is a flow diagram for one implementation of a method of validating information during account creation.

FIG. 12 is a flowchart 1200 for describing a method of validating personal identification information during account creation, or adding new or updated personal identification information to be validated and authenticated, by an attestor 1240. The method begins where the attestor site and/or the app of the user 1230 provides a login or entry screen for the user 1230, and the user 1230 proceeds to log on to the attestor 1240 (step 1210 of FIG. 12). The user 130 starts a process to get an account with the attestor 1240, and provides information to the attestor 1240 (step 1211 of FIG. 2). The information may include the user's social security number, date of birth, name, physical address, phone numbers, and the like. The attestor 1240 may check the user's information against an internal blacklist in order to determine whether or not to proceed with the creation of an account and the subsequent attestation of that user information (step 1213 of FIG. 12).

If the attestor 1240 determines to proceed, the attestor may perform an attestation protocol and a validation protocol on the user information. These protocols were described earlier above, for example, in relation to FIGS. 2-3. In one embodiment, the attestor 1240 may utilize one or more validators 1250 to perform some or all of the validation protocol, and may send the user information to the validator 1250 (step 1214 of FIG. 12). The attestor 1240 may perform other validation processes and check other records to see whether this account creation should continue. The one or more validators 1250 may check the validity of the data against internal and external records according to a validation protocol (step 1215 of FIG. 12) as previously described. The validation protocol may involve checking if the data provided by the user 1230 matches credit records (step 1212 of FIG. 2). The validation protocol may involve reviewing information available on social networks to analyze the likelihood that the user 1230 is a real person.

The one or more validators 1250 may utilize a statistical risk determination model to determine whether more information is needed to make a validity decision (step 1216 of FIG. 12). If yes, the one or more validators 1250 may generate further user information requirements such as a set of questions for the user 1230 to answer (step 1217 of FIG. 12). The questions may be questions such as where the user lived ten years ago, which companies the user has loans with, or other questions based on information that only that user should know readily. The one or more validators 1250 sends these additional user information requirements to the attestor 1240. The attestor 1240 makes a request for the additional user information requirements to the user 1230 (step 1218 of FIG. 12). In response, the user 1230 provides the answers to the additional information request to the attestor 1240 (step 1218 of FIG. 12). The attestor 1240 receives the additional user information, and in turn passes it to the one or more validators 1250 (step 1218 of FIG. 12).

If the one or more validators 1250 determines that no more information is needed to validate the user 1230, the one or more validators may send a statistical score which represents the likelihood of the user 1230 being authentic to the attestor 1240 (step 1219 of FIG. 12). The attestor 1240 may create a user account marked as temporary (step 1220 of FIG. 12), and may set a timer associated with the user account. The timer is set so that, if further validation steps are not completed within the time limit, the user account will be suspended, held, or deleted.

Even further validation steps may be taken for further assurance. The attestor 1240 may send a website link or URL to the user's email address in order to validate the user's email address (step 1221 of FIG. 12). The user 1230 may be required to go to or click on the link sent in the email from the attestor 1240, which will direct the user's browser to a web page of the attestor site for the user 1230 to enter further authenticating information to activate their account. In another aspect, the attestor 1240 may require the user 1230 to validate a provided phone number, by calling or texting the user 1230 at that phone number and collecting a response. In another aspect, the attestor 1240 could use a third party multi-factor authentication service such as AUTHY.COM or the like. In another aspect, the attestor 1240 could use one of various 2-factor or multi-factor authentication methods as known in the art. At step 1222 the attestor 1240 may send a postcard through a national mail service or other delivery service to the user 1230 at the residential or other address provided to the site. Upon receipt, the user 1230 may enter the code on this postcard into a form on the attestor application or website (step 1223 of FIG. 12) to validate that the user 1230 who created the account is also in control of the physical mail at that address. The attestor 1240 may mark the account created at step 1220 as permanently active (step 1224 of FIG. 12).

Figure 13A:
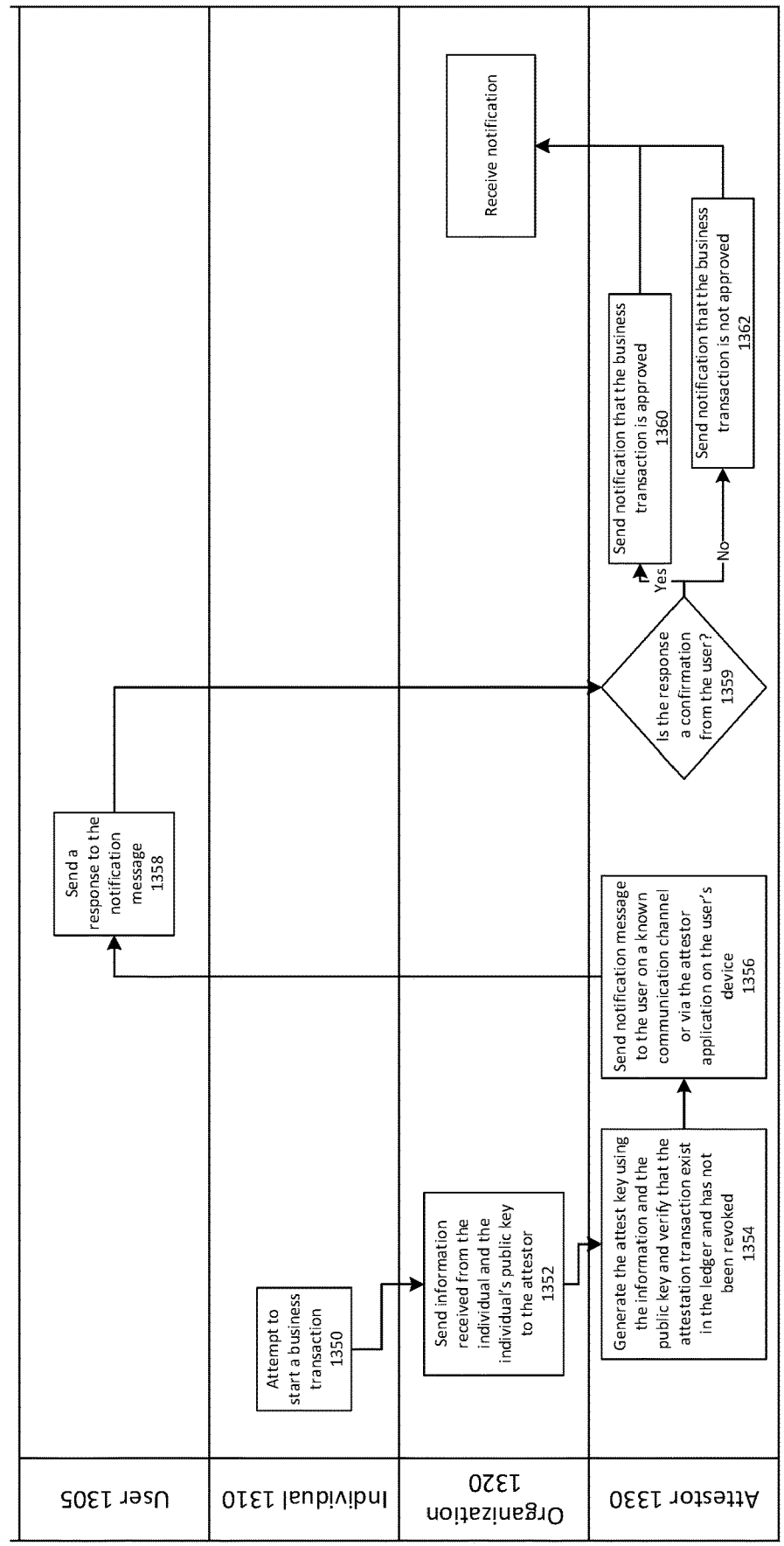
FIG. 13a is a flow diagram for one implementation of a method for notification of a user when information that belongs to that user is being used to attempt a transaction.

FIG. 13*a* is a flowchart 1300 for describing a method of notification messaging pertaining to the use of personal identification information of a user. In the method of FIG. 13a, an individual 1310, who may be legitimately the user 1305 or authorized by the user 1305, or alternatively who may be fraudulent, attempts to perform a transaction or receive a service in step 1350 from an organization 1320, the attempt including providing information of the user and the user's public key. In step 1352, the organization 1320 sends the information received from the individual attempting the transaction and the user's public key to the attestor 1330. The attestor generates the attest key using the information and the public key and generates the attestation address using the attest key and the public keys used to generate the original attestation transaction associated with the user and the information, and verifies whether the attestation transaction is stored within a centralized or distributed ledger at the attestation address, and whether the attestation transaction has not been revoked (e.g., cryptocurrency has not been spent) in step 1354. In step 1356, if the information has been previously attested to in an attestation transaction and the attestation transaction has not been revoked, the attestor sends a notification message to the user on a known communication channel or via the attestation application on the user's device. In one embodiment, the notification message may be sent to the user via a third party. In one embodiment, the third party could be the application provider. In one embodiment, the third party could be the attestor. In step 1358, the user responds to the notification message. The attestor 1330 determines whether or not the response from the user approves or does not approve the business transaction in step 1359. In step 1360, if the user confirms the business transaction, the attestor 1330 notifies the organization 1320 that the user approves the business transaction. In step 1362, if the user does not confirm the business transaction, the attestor 1330 notifies the organization 1320 that the user does not approve the business transaction.

In the method of FIG. 13a, an individual 1310, who may be legitimately the user 1305 or authorized by the user 1305, or who alternatively may be fraudulent, attempts to perform a transaction or receive a service. In one embodiment, the individual 1310 may be fraudulent but may be in control of the information that belongs to the user 1305. In one embodiment, the individual 1310 is the same entity as the user 1305. In one embodiment, the organization 1320 may be a merchant and the individual may be trying to make a purchase in step 1350. In one embodiment, the organization 1320 may be a bank or a financial institution and the individual may be trying to withdraw or transfer money in step 1350. It is obvious to those skilled in the art that there are many different kinds of transactions that an individual 1310 may initiate at an organization 1320 that would incur damage to the user 1305 if the individual 1310 was fraudulently pretending to be the user 1305. In step 1350, with the attempt to receive service, the individual 1310 sends to the organization 1320 previously attested to information and their public key. In one embodiment, the information is information that is needed to make the business transaction, and which has also been previously attested to. In step 1352, when the organization receives information and a public key from an individual 1310 that is seeking to make a transaction or receive a service, the organization can send this information to the attestor 1330 so that the attestor can verify that the information has been attested to and has not been revoked. In one embodiment, the organization or the attestor may send a cryptographic challenge nonce to the individual to be signed with the individual's private key, in order to verify that the individual has control of the private key corresponding to the public key. In one embodiment, the organization notifies the attestor that an attempt to use the user's 1305 information has been made. In one embodiment, the organization 1320 may indicate the particular type of request the individual 1310 is making, and may provide a remediation phone number in the request to the attestor 1330. In one embodiment, the attestor 1330 may provide an application or API to the organization 1320 such that the organization 1320 may directly contact the user 1305 about the use of the user information. In one embodiment, the organization 1320 sends the information and the public key provided to the attestor 1330 or the application or API provided by the attestor 1330 in order to verify the individual 1310. In one embodiment, the information provided may include a social security or identity number, and it is sent to the attestor 1330 or to the application or API provided by the attestor 1330, in order to verify the individual 1310. In one embodiment, the organization 1320 requests an additional piece of information from the individual 1310 in order to provide this information to the attestor 1330 in order to verify the individual 1310. In one embodiment, the attestor 1330 requests an additional piece of information from the organization 1320 in order to identify and verify the individual 1310. In one embodiment, a different third party performs the role of the attestor 1330 in FIG. 13a, via an API or application that the attestor 1330 makes available to such third-party service providers. In step 1354, the attestor 1330 verifies that the information of the individual 1310 that was received has been previously attested to. In one embodiment, the attestor 1330 may use the public key or the individual's information or the public attest key or the attestation address to identify the user in an existing database of attested users using standard database search functionality. In one embodiment, the attestor 1330 may create the attest key and attestation address using the information and the user's public key in order to verify that the information was previously attested to. In one embodiment, step 1354 is performed by the organization 1320 via access to an API or application of the attestor 1330. In one embodiment, the existing database of attested users is stored by the attestor 1330. In one embodiment, the existing database of attested users is stored in an online or cloud based storage. In one embodiment, the database is provided by a third party. In one embodiment, the existing database includes all users with attested information regardless of the attestor that attested to the information. In one embodiment, different databases of users exist depending on the type of information that is attested to.

In one embodiment, the organization 1320 may be a client of the attestor 1330. In step 1354, the individual's information or public key or the attest key or the attestation address leads to the individual 1310 being identified in an existing database of attested users. In one embodiment, the attestor 1330 may require a minimum amount of information from the individual 1310 in order to uniquely identify an individual. In one embodiment, the attestor 1330 may require at least some subset of the individual's information such as the individual's name, date of birth and address in combination. In one embodiment, the attestor 1330 may only require a single piece of the individual's information, such as a social security number, as a non-limiting example. In step 1356, the attestor 1330 sends a notification message on a communication channel of the user. In one embodiment, the notification message may be delivered to the user through the use of the attestor application on a user device. In one embodiment, the notification message is to inform the user 1305 of the attempt to start a business transaction. In one embodiment, the attestor 1330 sends the notification message on a preferred communication channel of the user 1305. In one embodiment, the user 1305 may be prompted or asked to authorize the access to the service, and may be able to allow or deny the access to the service based on a query presented at the user's device. In one embodiment, the user 1305 may be able to allow or deny the access to the service by responding to a text message or a voice call. Where the user 1305 is queried about the service on more than one communication channel, the user 1305 may be required to authorize the transaction on one, more than one, or all of the communication channels. In step 1358, the user 1305 sends a response to the notification message. In one embodiment, the response to the notification message is from the user 1305 to the attestor 1330. In one embodiment, the response to the notification message includes either a confirmation from the user 1305 of the attempt to start a business transaction or a denial from the user 1305 of the attempt to start a business transaction. In one embodiment, the user 1305 sends the response to the notification message on a preferred communication channel. In one embodiment, the user 1305 indicates the response to the notification message on an attestor application on the user's device. In step 1359, the attestor determines if the response from the user 1305 is a confirmation of the attempt to start a business transaction. If the response is a position confirmation of the attempt to start a business transaction, then the attestor 1330 sends a notification to the organization 1320 that the business transaction is approved by the user 1305, and therefore the user 1305 and the individual 1310 are likely to be the same person. If the response is a denial of the attempt to start a business transaction, then the attestor 1330 sends a notification to the organization 1320 that the business transaction is not approved by the user 1305, and therefore the individual 1310 that is attempting to start the business transaction is likely fraudulent.

Figure 13B:
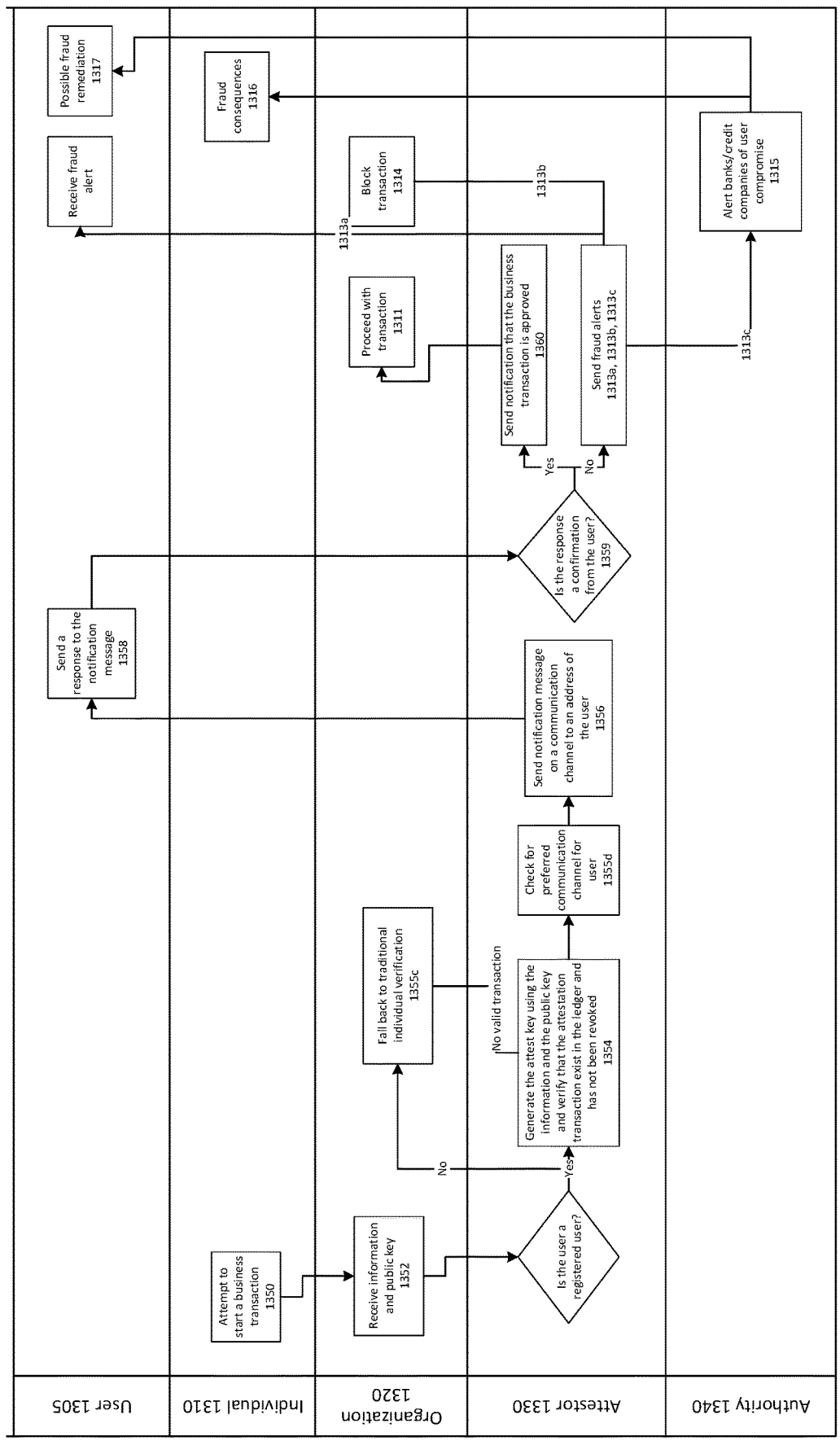
FIG. 13b is a flow diagram for a further implementation of a method for notification of a user when information that belongs to that user is being used to attempt a transaction.

The method of FIG. 13*b* shows a further embodiment of the method described in FIG. 13*a*. As before, in step 1350, with the attempt to receive service, the individual 1310 sends to the organization information and their public key. In step 1352, when the organization receives information and the public key from an individual 1310 that is seeking to make a transaction or receive a service, the organization can send this information to the attestor 1330. In one embodiment, the attestor may verify that the user indicated in the information sent by the organization is a registered user that holds a valid account at an attestor. As previously discussed, in one embodiment, the attestor 1330 may look for the information or the public key or the attest key in an existing database of attested users using standard database search functionality. In one embodiment, the attestor 1330 may positively identify an existing authenticated and registered user that holds a valid account at the attestor (a registered user) using the information and/or the public key of the individual that has been received. If the user is not a registered user and does not hold a valid account, the attestor 1330 informs the organization 1320 and the organization falls back to traditional individual verification. If the user is registered and does hold a valid account, in step 1354, the attestor 1330 uses the information and the public key to generate the attest key and uses the attest key to generate the attestation address, and verifies that the attestation transaction is present at the attestation address and that the attestation transaction has not been revoked. If the attestor 1330 determines that there is not a valid attestation transaction representing the user information, then the attestor 1330 alerts the organization 1320 that they are not able to verify the information of the individual 1310 and in step 1355*c*, the organization falls back to traditional methods of verifying the individual 1310 in order to process or decline the business transaction. In one embodiment, in step 1355*d*, the attestor 1330 checks for the preferred communication channel of the user 1305, for example the attestor 1330 may check any communication preference of the user 1305 identified in the user's profile. For example, the user's communication preference may be any one of SMS or texting, email, push messaging to a specific smartphone or mobile device application, or another user-provided channel. In step 1356, the attestor 1330 sends a notification message on a communication channel to an address of the user 1305. In one embodiment, the notification message is to inform the user 1305 of the attempt to start a business transaction. In step 1358, the user 1305 sends a response to the notification message. In one embodiment, the response to the notification message is from the user 1305 to the attestor 1330. In one embodiment, the response to the notification message includes either a confirmation from the user 1305 of the attempt to start a business transaction or a denial from the user 1305 of the attempt to start a business transaction. In one embodiment, the user 1305 sends the response to the notification message on a preferred communication channel. In one embodiment, the user 1305 indicates the response to the notification message on an attestor application on the user's device. In step 1359, the attestor determines if the response from the user 1305 is a confirmation of the attempt to start a business transaction. If the response is a denial of the attempt to start a business transaction, then the attestor 1330 sends a notification to the organization 1320 that the business transaction is not approved by the user 1305, and therefore the individual 1310 that is attempting to start the business transaction is likely fraudulent. If the response is a confirmation from the user 1305, then in step 1360 the attestor 1330 sends a notification to the organization 1320 that the business transaction is approved by the user 1305, and therefore the user 1305 and the individual 1310 are likely to be the same person. In step 1311, upon receiving the notification that the business transaction is approved by the user 1305, the organization 1320 proceeds with the transaction. In the case where the response from the user 1305 is not a confirmation of the transaction attempt, the attestor 1330 sends a fraud alert to the user 1305 in step 1313*a*. In one embodiment, the attestor 1330 sends a fraud alert to the organization 1320 in step 1313*b*. In one embodiment, the attestor 1330 sends a fraud alert to the authority 1340 in step 1313*c*. If the organization 1320 receives a fraud alert from the attestor in step 1313*b*, then in one embodiment, the organization 1320 may block the business transaction in step 1314. When the authority 1340 receives a fraud alert from the attestor 1330 in step 1313*c*, in one embodiment the authority may alert banks or credit card companies of the user compromise in step 1315. In one embodiment, the authority 1340 may initiate fraud consequences against the individual 1310 in step 1316. In one embodiment, fraud consequences may involve charges being brought against the individual. In one embodiment, the authority 1340 may additionally initiate fraud remediation for the user in step 1317. In one embodiment, fraud remediation may involve the immediate suspension of all user accounts. In one embodiment, fraud remediation may involve tracking any further use on any user accounts. In one embodiment, fraud remediation may involve the reissue of one or more accounts of the user 1305.

Figure 14:
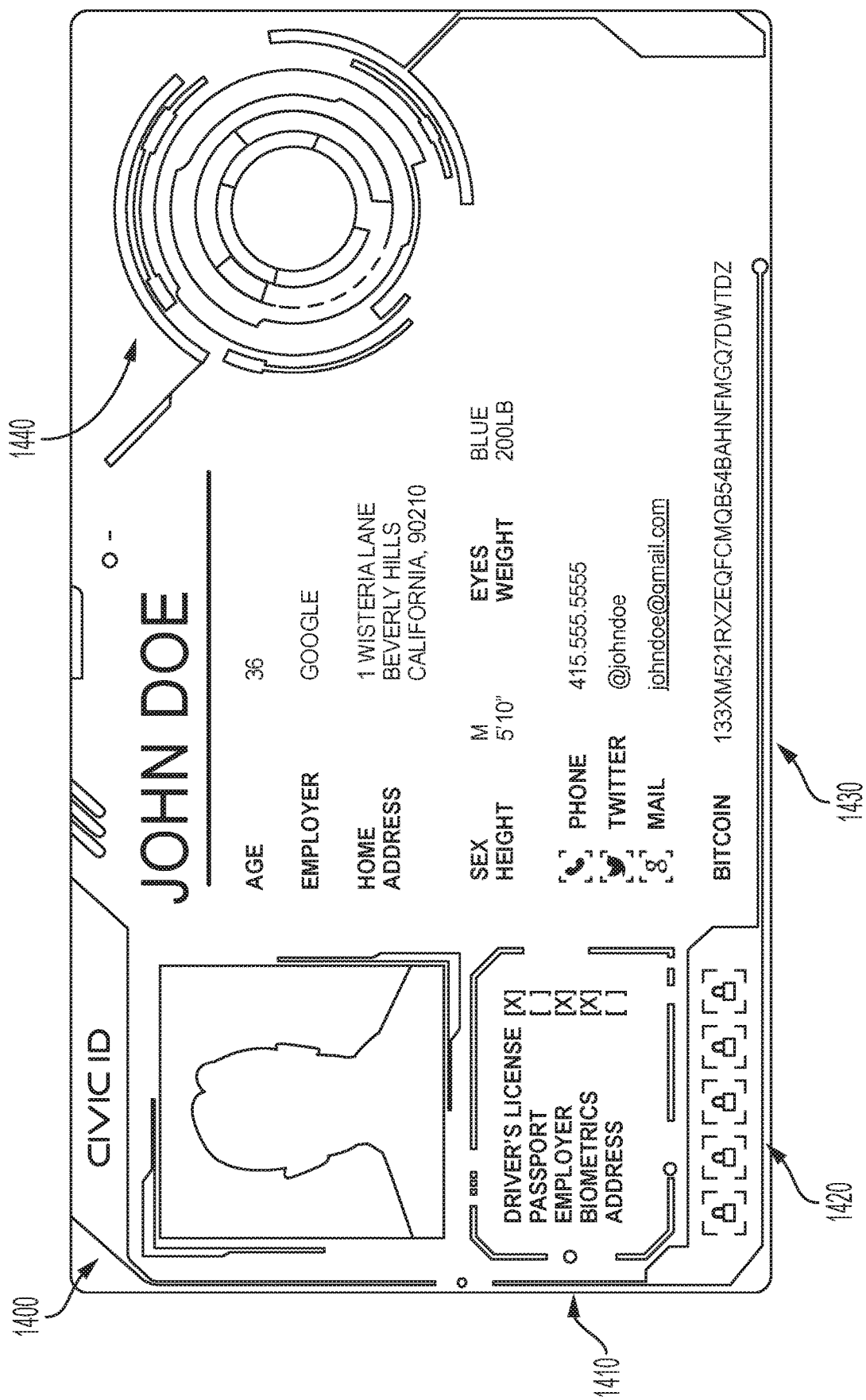
FIG. 14 is an illustration of a display presentation or identification card which includes various personal identification information for use in the system in accordance with exemplary embodiments of the disclosed subject matter.

FIG. 14 shows an application screen for a user to provide information to a validator. A user interface screen on the user's mobile device may simulate an identification card

1400. The identification card 1400 may present Personal Identification information, which may include a photograph of the user, their age, their employer, their home address, their sex, height, eye color, weight, phone number, messaging address, email address, social media address/username/ handle, etc. It may also show their digital crypto-currency recipient address 1430. The identification card 1400 may include a series of checkboxes 1410 (e.g., on the bottom left of the figure) showing what sources of information are authenticated by the attestor. In this example, the identification card shows that the authenticated user information is the users driver's license, employer, and biometrics. The address may not be attested to as the section next to address is unchecked, and lock icons 1420 may indicate a level of security of the card.

In order to communicate to a verifier, the identification card 1400 may present an animated image 1440 that conveys information to a verifier application or an attestor application running on another smartphone or using a camera attached to a computer. The identification card 1400 may be placed so that the moving image 1440 can be viewed by the receiving application. The data transfer may be used to send authenticated information as described in FIG. 2-FIGS. 5a/5b and herein.

The user may also use the identification card 1400 to log into a site such as a website. In this case, the site may display a moving graphic as in 1440 but in this case the attestor application may use a smartphone camera to record and interpret the information being transmitted from the site. An application for the identification card 1400 may then transmit appropriate attested credentials to the site as described herein.

Figure 15:
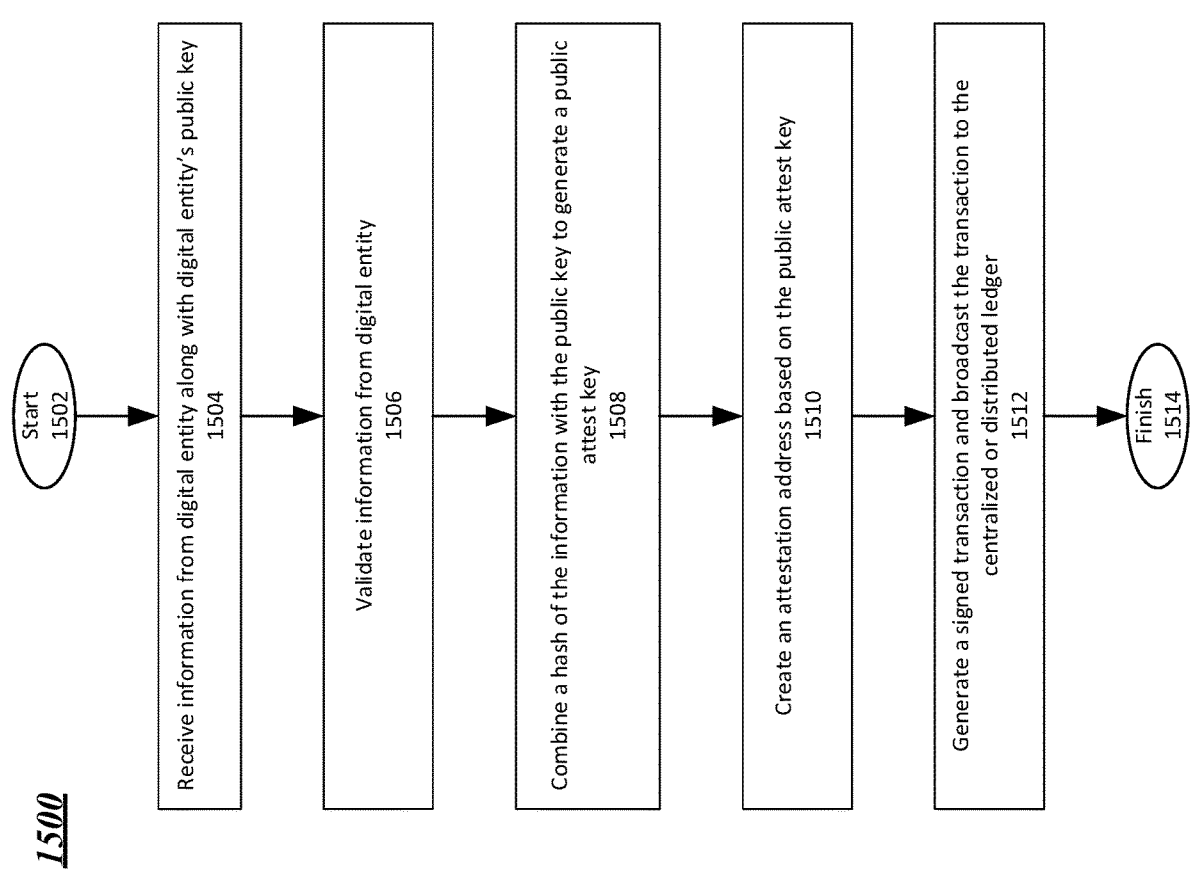
FIG. 15 is a flow diagram for one implementation of a method of authenticating the identity of a digital entity.

FIG. 15 is a flowchart 1500 for describing a method of using the protocols described herein in order to authenticate the identity of a digital entity on the Internet. The methods described herein eliminate the need for a conventional third party such as a certificate authority (CA) vendor. A CA vendor is a trusted entity that issues electronic documents that verify a digital entity's identity on the Internet. The electronic documents, which are called digital certificates, are an essential part of conventional secure communication and play an important part in the public key infrastructure (PKI). Certificates typically include the owner's public key, the expiration date of the certificate, the owner's name and other information about the public key owner. A foundational element of the Secure Sockets Layer/Transport Layer Security (SSL/TLS) certificate system is that browser vendors need to trust the CA vendors that issue certificates. If trust in a CA vendor is lost, then major browsers will distrust and block websites that use digital certificates signed by this vendor in order to prevent malicious hacking and man in the middle attacks. CA vendors store certificates in their own infrastructure, and that infrastructure itself may be hacked. For example, one CA vendor was found to have issued fraudulent SSL certificates for a number of domains. An investigation showed that this was caused by an intrusion into the CA vendor's infrastructure. Therefore, there are inherent weaknesses in the conventional CA systems, due to the fact that the CA vendors are being trusted with the storage and safekeeping of the digital certificates, and are vulnerable to intrusions.

An attestor and a company may create an attestation transaction that users, operating systems, browsers, and other entities including prospective communication or transaction partners may use in place of the SSL certificates issued by traditional CA vendors. The method starts at start block 1502. In step 1504, the attestor receives information and a public key from a digital entity that wishes to have their information and identity validated and attested to. In step 1506, the attestor validates the information received from the digital entity, performing diligence on the digital entity to ensure it is legitimate. In step 1508, the attestor combines a hash of the information with the public key to create a public attest key, according to the attestation protocol described herein. In step 1510, the attestor creates an attestation address based on the public attest key. In step 1512, the attestor generates a signed transaction and broadcasts the transaction to a centralized or distributed ledger. The method finishes at finish block 1514.

In step 1504, the information that the attestor receives from the digital entity may be the name of the digital entity. In one embodiment, the information that the digital entity must provide is standardized. In one embodiment, the digital entity may provide more information than is required in order to assist with the process of validating the digital entity. In one embodiment, the information may include the domain name of the digital entity. In step 1506, the attestor performs diligence on the digital entity and validates the information received from the digital entity. In one embodiment, this diligence may include the attestor validating that the digital entity owns, or has the legal right to use, the domain name that is included in the information. In one embodiment, the attestor may validate that the digital entity is a legitimate and legally accountable entity.

In step 1508, the attestor begins the method of creating an attestation transaction using the information of the digital entity and the public key of the digital entity, by creating a hash of the information and combining the hash of the information with the public key of the digital entity to create a public attest key. In step 1510, the attestor creates an attestation address based on the public attest key, as previously described. In step 1512, the generates a signed transaction using their private key, and broadcasts the transaction to the centralized or distributed network. The method ends at finish block 1514.

Figure 16:
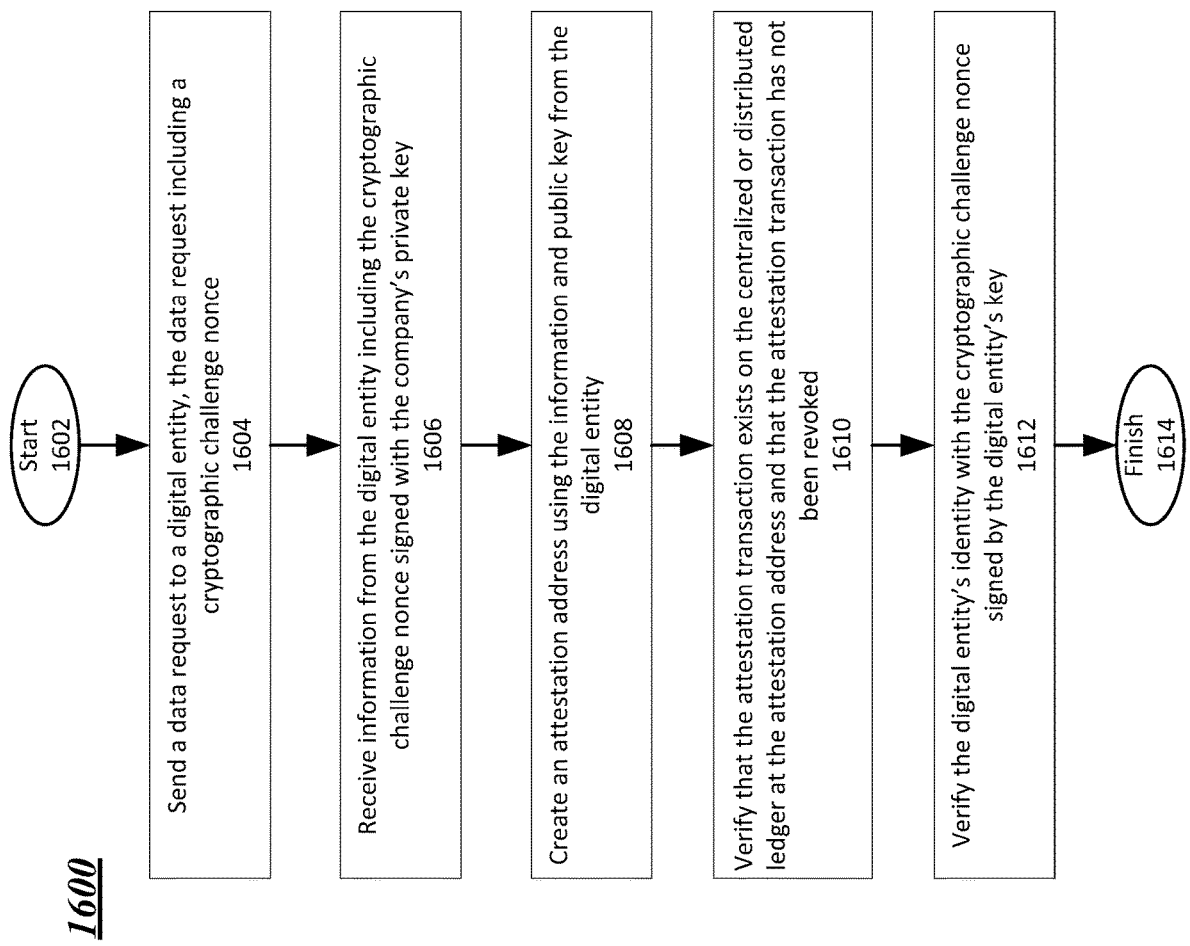
FIG. 16 is a flow diagram for a further implementation of a method of authenticating the identity of a digital entity.

FIG. 16 is a flowchart illustrating a method by which a user, for example a user's web browser or operating system, can determine whether it should trust a server of a digital entity. The method can proceed without relying on an additional third party, such as a traditional CA vendor. The digital entity has previously had their information validated and attested to by an attestor, as described above. The method begins at start block 1602. In step 1604, the user sends a request for information to the digital entity, the request for information including a cryptographic challenge nonce. In one embodiment, the information that the user requests is a standardized set of information. In one embodiment, the information that the user requests includes the digital entity's public key. In one embodiment the digital entity's public key is displayed on the website of the digital entity. In step 1606, the user receives information from the digital entity including the cryptographic challenge nonce signed with the digital entity's private key. In step 1608, the user creates an attestation address using the information received from the digital entity and the digital entity's public key using the protocols previously described herein. In step 1610, the user uses the attestation address to verify that the attestation transaction exists on the centralized or distributed ledger at the attestation address, and that the attestation transaction has not been revoked. In one embodiment, an attestor application or API or plug in is utilized by the user to verify that the attestation address exists and has not been revoked. In one embodiment, the process of verifying that the attestation transaction has not been revoked comprises checking to see if the attestation transaction exists in the UTXO cache. In step 1612, the user uses the signed cryptographic nonce to verify that the digital entity has control over the private key of the public-private key pair as is known in the art. Upon receiving verification that the attestation transaction exists on the centralized or distributed ledger and has not been revoked and/or receiving verification of the digital entity's identity, the user can trust the digital entity and proceed to access their server. In this way, a method is provided by which a user can verify the validity of a digital entity without having to trust a CSL or OCSP with the storage and management of signed certificates.

In one embodiment, the digital entity could, for example, display a code on their website which provides their information and their public key and indicate that they are validated via an attestor. When a user subsequently wants to verify that this digital entity is legitimate and that they can trust the digital entity's certificate, the user can simply receive the digital entity information directly from the website. It should be understood that any of the above steps may be performed by an attestor on behalf of the user or the company. In one embodiment, the user may verify that the digital entity has control over their private key prior to verifying that the attestation transaction exists at the attestation address on the centralized or distributed ledger and that the attestation transaction has not been revoked. In one embodiment, the signed transaction in the ledger may be revoked by the digital entity or by the attestor using a revocation protocol. In one embodiment, the information may be hashed with a cryptographic hash function, for example, SHA256, RIPEMD160, or both.

While the foregoing describes a particular set of techniques for attesting and validating information, it will be understood that information attestation has wider applicability, and may be usefully employed to augment, civic transactions, financial transactions identity verification, political transactions, contracts, treaties, digital signatures, and a wide range of other useful processes.

The above systems, devices, methods, processes, and the like may be realized in hardware, software, or any combination of these suitable for an application. The hardware may include a general-purpose computer and/or dedicated computing device. This includes realization in one or more microprocessors, microcontrollers, embedded microcontrollers, programmable digital signal processors or other programmable devices or processing circuitry, along with internal and/or external memory. This may also, or instead, include one or more application specific integrated circuits, programmable gate arrays, programmable array logic components, or any other device or devices that may be configured to process electronic signals. It will further be appreciated that a realization of the processes or devices described above may include computer-executable code created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software. In another aspect, the methods may be embodied in systems that perform the steps thereof, and may be distributed across devices in several ways. At the same time, processing may be distributed across devices such as the various systems described above, or all the functionality may be integrated into a dedicated, standalone device or other hardware. In another aspect, means for performing the steps associated with the processes described above may include any of the hardware and/or software described above. All such permutations and combinations are intended to fall within the scope of the present disclosure.

Embodiments disclosed herein may include computer program products comprising computer-executable code or computer-usable code that, when executing on one or more computing devices, performs any and/or all the steps thereof. The code may be stored in a non-transitory fashion in a computer memory, which may be a memory from which the program executes (such as random access memory associated with a processor), or a storage device such as a disk drive, flash memory or any other optical, electromagnetic, magnetic, infrared or other device or combination of devices. In another aspect, any of the systems and methods described above may be embodied in any suitable transmission or propagation medium carrying computer-executable code and/or any inputs or outputs from same.

It will be appreciated that the devices, systems, and methods described above are set forth by way of example and not of limitation. Absent an explicit indication to the contrary, the disclosed steps may be modified, supplemented, omitted, and/or re-ordered without departing from the scope of this disclosure. Numerous variations, additions, omissions, and other modifications will be apparent to one of ordinary skill in the art. In addition, the order or presentation of method steps in the description and drawings above is not intended to require this order of performing the recited steps unless an order is expressly required or otherwise clear from the context.

The method steps of the implementations described herein are intended to include any suitable method of causing such method steps to be performed, consistent with the patentability of the following claims, unless a different meaning is expressly provided or otherwise clear from the context. So, for example performing the step of X includes any suitable method for causing another party such as a remote user, a remote processing resource (e.g., a server or cloud computer) or a machine to perform the step of X. Similarly, performing steps X, Y and Z may include any method of directing or controlling any combination of such other individuals or resources to perform steps X, Y and Z to obtain the benefit of such steps. Thus, method steps of the implementations described herein are intended to include any suitable method of causing one or more other parties or entities to perform the steps, consistent with the patentability of the following claims, unless a different meaning is expressly provided or otherwise clear from the context. Such parties or entities need not be under the direction or control of any other party or entity, and need not be located within a particular jurisdiction.

It should further be appreciated that the methods above are provided by way of example. Absent an explicit indication to the contrary, the disclosed steps may be modified, supplemented, omitted, and/or re-ordered without departing from the scope of this disclosure.

It will be appreciated that the methods and systems described above are set forth by way of example and not of limitation. Numerous variations, additions, omissions, and other modifications will be apparent to one of ordinary skill in the art. In addition, the order or presentation of method steps in the description and drawings above is not intended to require this order of performing the recited steps unless a particular order is expressly required or otherwise clear from the context. Thus, while particular embodiments have been shown and described, it will be apparent to those skilled in the art that various changes and modifications in form and details may be made therein without departing from the spirit and scope of this disclosure and are intended to form a part of the disclosure as defined by the following claims, which are to be interpreted in the broadest sense allowable by law.

What is claimed is:

1. A system, comprising:
a computing device comprising one or more processors and a network interface;
wherein the network interface is configured to:
receive a request to process a transaction associated with a user, a set of information about the user or an account of the user, and a public key of the user,
send to a device of the user, a cryptographic challenge nonce, and
receive, from the device of the user, the cryptographic challenge nonce signed by a private key of the user;
wherein the one or more processors are configured to:
verify the signed cryptographic challenge nonce with the public key of the user,
derive a public attest key based on the set of information about the user or the account of the user,
derive an attestation address using the public attest key,
verify an existence of an attestation transaction at the attestation address in a centralized or distributed ledger, and
process the transaction responsive to verification of the existence of the attestation transaction.

2. The system of claim 1, wherein the computing device further comprises a display configured to display an indication of verification of the existence of the attestation transaction.

3. The system of claim 1, wherein the network interface is further configured to receive, from the device of the user, login information; and wherein the one or more processors are further configured to validate the login information.

4. The system of claim 3, wherein the network interface is further configured to receive the set of information about the user or the account of the user from the device of the user.

5. The system of claim 1, wherein the network interface is further configured to transmit a request to a second computing device of an attestor for the set of information about the user or the account of the user.

6. The system of claim 5, wherein the network interface is further configured to receive the set of information about the user or the account of the user from the second computing device of the attestor.

7. The system of claim 1, wherein the network interface is further configured to send the cryptographic challenge nonce to a digital wallet of the user.

8. The system of claim 7, wherein the network interface is further configured to receive, from the digital wallet of the user, the cryptographic challenge nonce signed by the user's private key.

9. The system of claim 1, wherein the network interface is further configured to receive from the user the information and the public key; and
wherein the one or more processors are further configured to:
apply a hash function to the information to create a hash of the information,
combine the hash of the information with the public key to generate the public attest key,
generate the attestation address based on the public attest key, the attestation address not previously associated with a transaction in the centralized or distributed ledger, and
communicate a signed transaction to the centralized or distributed ledger for storage at the attestation address.

10. The system of claim 1, wherein the set of information about the user or the account of the user is not randomly generated.

11. The system of claim 1, wherein the set of information of the user does not include the transaction associated with the user.

12. A method, comprising:
receiving, by a first computing device, a request to process a transaction associated with a user, a set of information about the user or an account of the user, and a public key of the user;
sending, by the first computing device to a device of the user, a cryptographic challenge nonce;
receiving, by the first computing device from the device of the user, the cryptographic challenge nonce signed by a private key of the user;
verifying, by the first computing device, the signed cryptographic challenge nonce with the public key of the user;
deriving, by the first computing device, a public attest key based on the set of information about the user or the account of the user;
deriving, by the first computing device, an attestation address using the public attest key;
verifying, by the first computing device, an existence of an attestation transaction at the attestation address in a centralized or distributed ledger; and
processing, by the first computing device, the transaction responsive to verification of the existence of the attestation transaction.

13. A system, comprising:
a first computing system comprising processor circuitry and a communication interface;
wherein the first computing system is configured to establish a secure communication link with a second computing system associated with a user via the communication interface, and receive, via the secure communication link, a set of information about the user or the account of the user; and
wherein the processor circuitry is configured to:
derive a public attest key based on the set of information about the user or the account of the user,
derive an attestation address using the public attest key,
verify an existence of an attestation transaction at the attestation address in a centralized or distributed ledger, and
process a transaction, responsive to verification of the existence of the attestation transaction.

14. The system of claim 13, wherein the processor circuitry is further configured to:
send a cryptographic challenge nonce to the second computing system associated with the user;
receive the cryptographic challenge nonce signed by the user's private key; and
verify user identity with the cryptographic challenge nonce signed by the user's private key.

15. The system of claim 13, wherein the communication interface comprises an optical input device, and wherein the optical input device is configured to receive a visual code displayed on a display unit of the second computing system associated with the user, the visual code used to establish the secure communication link via the communication interface.

16. The system of claim 15, wherein the visual code comprises at least one of a communication address of the second computing system and a cryptographic key for encrypting communications of the secure communication link.

17. The system of claim 15, wherein the visual code comprises a one-dimensional barcode, a two-dimensional barcode (QR code) or a motion QR code.

18. The system of claim 13, wherein the communication interface comprises a wireless receiver, and wherein the input device is configured to establish the secure communication link with a transmitter of the second computing device.

19. The system of claim 18, wherein the wireless receiver comprises at least one of a WiFi receiver, Bluetooth receiver, Bluetooth LE receiver, near field communications (NFC) receiver, infrared receiver, RFID receiver, ambient audio receiver, and supersonic audio communication receiver.

20. The system of claim 13, wherein the first computing device further comprises a display configured to display a presentation for selection by the user of the set of information of the user.

21. The system of claim 13, wherein the processor circuitry is further configured to maintain a database of attestation transactions, each attestation transaction relating to one or more items of information of the user or another user and comprising an attestation address based on a public attest key derived by combining a hash of the corresponding information of the corresponding user or another user with a public key generated for the corresponding information.

22. The system of claim 13, wherein the communication interface comprises a network interface, and wherein the processor circuitry is configured to verify the existence of the attestation transaction by transmitting, via the network interface, a query comprising the attestation address to a third computing system maintaining the centralized or distributed ledger.

* * * * *